United States Patent
Choi et al.

(10) Patent No.: US 10,653,057 B2
(45) Date of Patent: May 19, 2020

(54) MOVING ROBOT AND CONTROL METHOD THEREOF

(71) Applicant: LG ELECTRONICS INC., Seoul (KR)

(72) Inventors: Kyuchun Choi, Seoul (KR); Jaehoon Lee, Seoul (KR); Jieun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 15/679,723

(22) Filed: Aug. 17, 2017

(65) Prior Publication Data
US 2018/0064024 A1  Mar. 8, 2018

Related U.S. Application Data

(60) Provisional application No. 62/383,504, filed on Sep. 5, 2016.

(51) Int. Cl.
| | | |
|---|---|---|
| *A01D 34/00* | (2006.01) | |
| *G05D 1/02* | (2020.01) | |
| *A01D 101/00* | (2006.01) | |

(52) U.S. Cl.
CPC ......... *A01D 34/008* (2013.01); *G05D 1/0219* (2013.01); *G05D 1/0225* (2013.01); *G05D 1/0227* (2013.01); *G05D 1/0238* (2013.01); *G05D 1/0265* (2013.01); *G05D 1/0274* (2013.01); *A01D 2101/00* (2013.01); *G05D 2201/0208* (2013.01)

(58) Field of Classification Search
CPC ............. A01D 34/008; A01D 2101/00; G05D 1/0219; G05D 1/0274; G05D 1/0265; G05D 1/0225; G05D 1/0227; G05D 1/0238; G05D 2201/0208
USPC .......................................................... 701/25
See application file for complete search history.

(56) References Cited

U.S. PATENT DOCUMENTS

| | | | |
|---|---|---|---|
| 2012/0083961 A1* | 4/2012 | Sato ..................... | G05D 1/0259 701/25 |
| 2013/0192183 A1* | 8/2013 | Choi .................... | A01D 34/008 56/10.2 A |
| 2013/0192184 A1* | 8/2013 | Choi .................... | A01D 34/008 56/10.2 A |

FOREIGN PATENT DOCUMENTS

EP    2939513    * 11/2015

* cited by examiner

*Primary Examiner* — Muhammad Shafi
(74) *Attorney, Agent, or Firm* — Dentons US LLP

(57) ABSTRACT

A lawn mowing robot includes a body, a driving unit driven such that the body moves within an operation region, and a controller setting first information related to at least one reference line using coordinate information corresponding to vertices included in a polygon forming an operation region and setting second information related to a plurality of regions such that the operation region is divided into the plurality of regions using the first information, wherein the controller controls the driving unit such that the body moves according to a preset movement pattern by the plurality of divided regions using the second information.

17 Claims, 19 Drawing Sheets

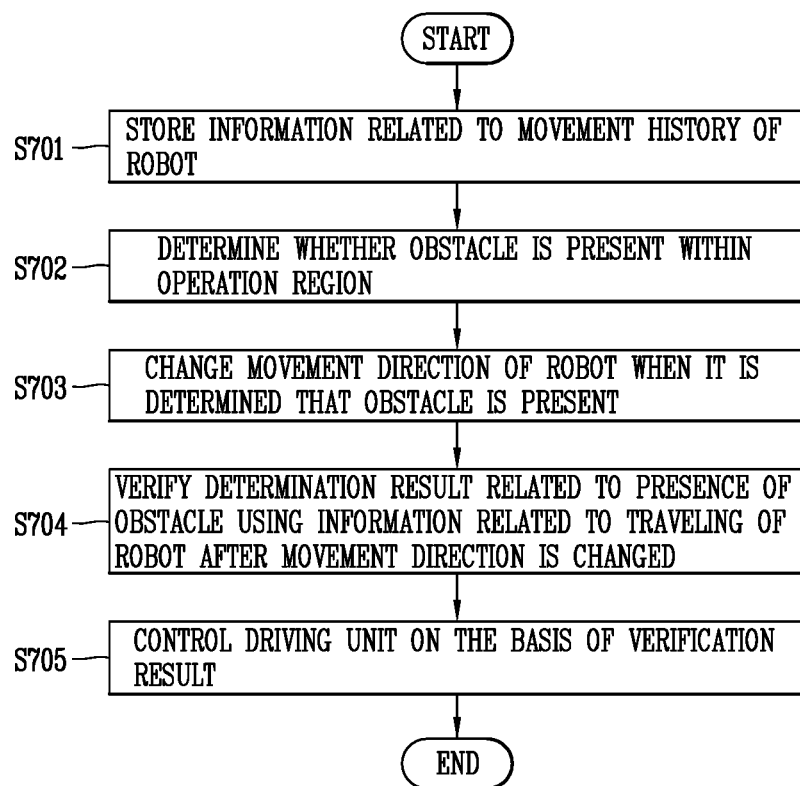
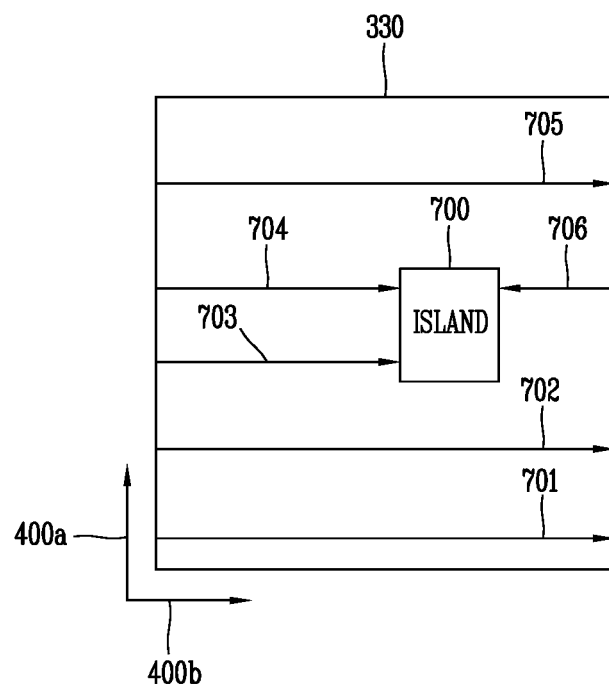

MOVING ROBOT AND CONTROL METHOD THEREOF

CROSS-REFERENCE TO RELATED APPLICATION

Pursuant to 35 U.S.C. § 119(a), this application claims the benefit of an earlier filing date of and the right of priority to U.S. Provisional Application No. 62/383,504, filed on Sep. 5, 2016, the content of which is incorporated by reference herein in their entirety.

BACKGROUND OF THE INVENTION

1. Field of the Invention

The present disclosure relates to a moving robot and a control method thereof, and particularly, to a mowing robot moving on an inner side of a wire and a control method thereof.

2. Background of the Invention

A lawn mower is a machine for cutting grass that grows in a yard of a house, a playing field, and the like. The lawn mower may be classified as a home lawn mower used in houses and a tractor lawn mower used in a large playing field or a large farm.

The home lawn mower includes a walk-behind type lawn mower which requires a human to walk behind and guide the mower to mow the lawn and a hand type lawn mower which a human directly carries with his hand.

However, the two types of lawn mower are cumbersome in that a human should directly operate them.

In particular, in the modern busy daily lives, it is difficult for users to directly operate a lawn mower to mow the lawn of the ground (or a yard), users mostly employ a worker to mow the lawn, incurring cost for employment.

Thus, in order to avoid the additional cost and save a user's trouble, an automatic robot type lawn mower, i.e., a lawn mowing robot, has been developed. Various studies have been conducted in order to control movement performance of such a lawn mowing robot.

Meanwhile, compared with an operation region of any other moving robots, an operation region of a lawn mowing robot has different properties, and a lawn mowing robot equipped with a traveling algorithm of a general moving robot has a significantly low operation efficiency in an operation region.

In detail, a contour line formed by an operation region of a lawn mowing robot may have various forms, compared with an indoor space, and a ground of the operation region of the lawn mowing robot may be formed of a material different from that of an indoor space, and thus, a lawn mowing robot using an algorithm related to traveling of a related art moving robot has low operation efficiency.

SUMMARY OF THE INVENTION

Therefore, an aspect of the detailed description is to provide a lawn mowing robot having high operation efficiency in an operation region, and a control method thereof.

Another aspect of the detailed description is to provide a lawn mowing robot having a high operation performance rate regarding an operation region, and a control method thereof.

To achieve these and other advantages and in accordance with the purpose of this specification, as embodied and broadly described herein, a lawn mowing robot includes: a body; a driving unit driven such that the body moves within an operation region; and a controller setting first information related to at least one reference line using coordinate information corresponding to vertices included in a polygon forming an operation region and setting second information related to a plurality of regions such that the operation region is divided into the plurality of regions using the first information, wherein the controller controls the driving unit such that the body moves according to a preset movement pattern by the plurality of divided regions using the second information.

According to an embodiment related to the present disclosure, the controller may detect coordinate information corresponding to a concave vertex of the vertices and set the first information using the detected coordinate information, and an internal angle of the polygon formed around the concave vertex may be an obtuse angle.

According to an embodiment related to the present disclosure, the controller may select any one of the at least one reference line using third information related to a preset traveling direction, and set the second information using the first information related to the selected reference line.

When it is determined that a concave vertex is not present in the vertices, the controller may set the second information such that the operation region is divided into a plurality of regions using fourth information related to a predetermined maximum traveling distance value.

According to an embodiment related to the present disclosure, when a maximum length of the divided region in a preset traveling direction is greater than a predetermined maximum traveling distance value, the controller may reset the second information such that the divided region is divided into a plurality of sub-regions.

According to an embodiment related to the present disclosure, the controller may set information related to the number of the sub-regions using the maximum length value and the maximum traveling distance value in the traveling direction.

According to an embodiment related to the present disclosure, the controller may control the driving unit such that the body moves to a region spaced apart from a contour line of the divided region by a predetermined additional traveling distance according to the preset movement pattern.

According to an embodiment related to the present disclosure, the lawn mowing robot may further include: a sensing unit sensing coordinate information related to a position of the body according to movement of the body, wherein the controller generates polygonal map information related to the operation region using the coordinate information sensed by the sensing unit.

According to an embodiment related to the present disclosure, the controller may calculate a difference in area between a rectangle tangent to a polygon corresponding to the generated map information and the polygon, set information related to the rectangle such that the calculated difference in area has a minimum value, and set information related to a traveling coordinate axis of the lawn mowing robot using the set information related to the rectangle.

According to an embodiment related to the present disclosure, the lawn mowing robot may further include: a memory storing information related to movement history of the body, wherein the controller may determine whether an obstacle is present in at least a partial region of the plurality of divided regions on the basis of the information related to the movement history, and when it is determined that an obstacle is present in the partial region, the controller may control the driving unit to change a movement direction of the body, and after the movement direction is changed, the controller may verify the determination result related to the presence of the obstacle using information related to traveling of the body.

To achieve these and other advantages and in accordance with the purpose of this specification, as embodied and broadly described herein, a method for controlling a lawn mowing robot includes: setting first information related to at least one reference line using coordinate information corresponding to vertices included in a polygon forming an operation region; setting second information related to a plurality of regions such that the operation region is divided into the plurality of regions using the first information; and moving according to a preset movement pattern by the plurality of divided regions using the second information.

According to the present disclosure, an effect of minimizing a portion in which lawn is not mowed in an operation region of the lawn mowing robot can be obtained.

Also, according to the present disclosure, operation efficiency of the lawn mowing robot may be increased.

Also, according to the present disclosure, accuracy of map information related to an operation region stored in the lawn mowing robot may be enhanced.

Also, according to the present disclosure, power supply of the lawn mowing robot may be automated and various errors generated in the lawn mowing robot may be prevented.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 7A is a flow chart illustrating an embodiment of a method for determining whether an obstacle is present within an operation region of a moving robot according to the present disclosure.

FIG. 7B is a conceptual view illustrating the embodiment illustrated In FIG. 7A.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
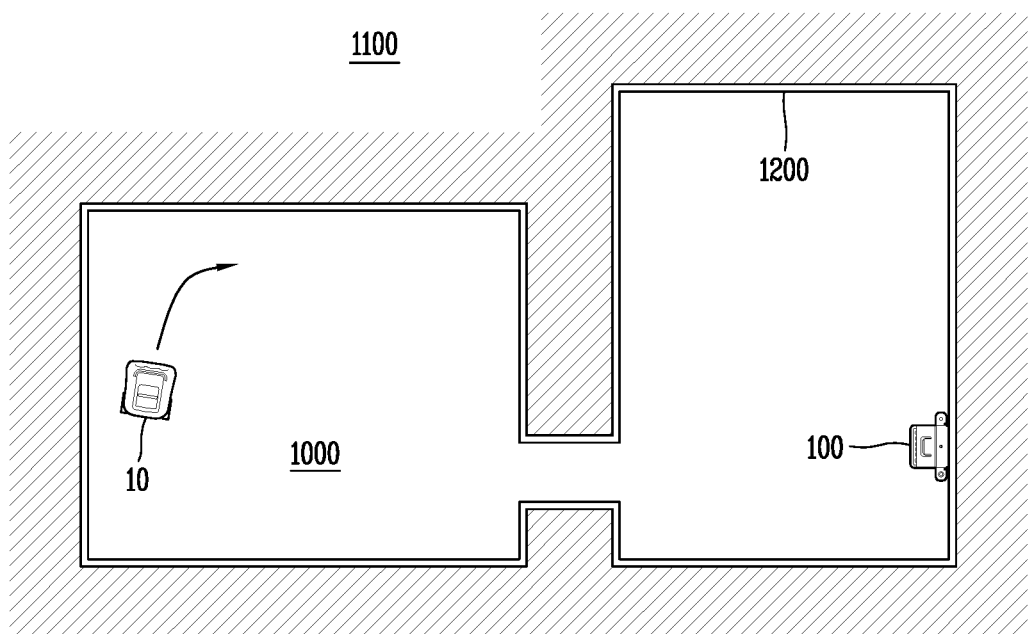
FIG. 1A is a conceptual view illustrating an embodiment in which a moving robot and a charging device of the moving robot are installed in an operation region of the moving robot according to the present disclosure.
Figure 1B:
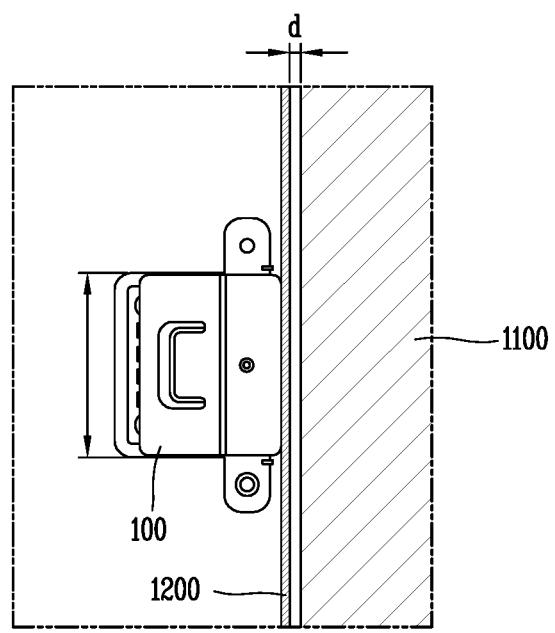
FIG. 1B is another conceptual view illustrating an embodiment in which a moving robot and a charging device of the moving robot are installed in an operation region of the moving robot according to the present disclosure.
Figure 1C:
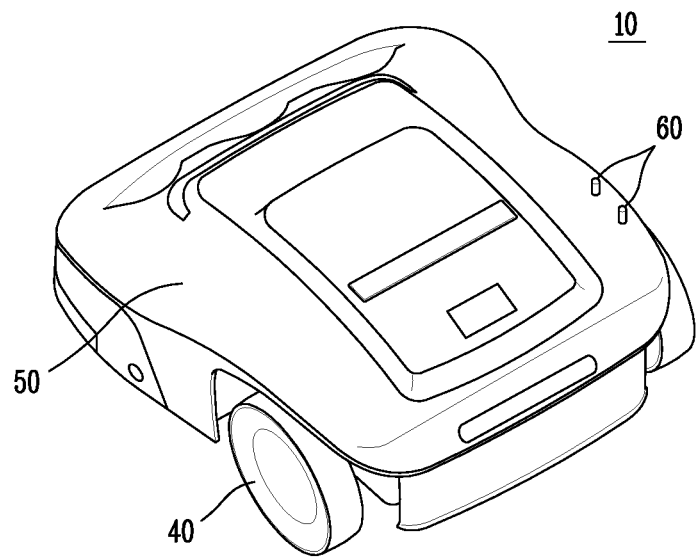
FIG. 1C is a conceptual view illustrating an embodiment of a moving robot.

FIGS. 1A and 1B are conceptual views illustrating an embodiment in which a charging device 100 of a moving robot 10 is installed in an operation region 1000 of the moving robot according to the present disclosure.

Referring to FIG. 1A, the moving robot 10 may travel by itself within a predetermined region. Also, the moving robot 10 may perform a specific operation during traveling.

In detail, the moving robot 10 may be a lawn mowing robot. Here, the specific operation may be cutting the lawn within the operation region 1000.

Also, the operation region 1000 may be defined by a wire 1200 formed as a closed curve or a closed loop. In detail, the wire 1200 may be installed in a certain region, and the moving robot 10 may move within an region defined by the closed curve formed by the installed wire 1200.

Meanwhile, referring to FIG. 1B, the wire 1200 may be installed within the operation region. In detail, the wire 1200 may be installed in a boundary between the operation region 1000 and an external region 1100, or may be installed to be spaced apart from the external region 1100 at a predetermined distance d. Here, the distance d where the wire 1200 is installed may be modified.

Thus, the user may install the wire 1200 along an outer side of the operation region 1000, and since a space in which the wire 1200 is installed from the outer side or the external region 1100 is not required to be considered, the wire 1200 may be more easily installed.

As illustrated in FIG. 1B, the charging device 100 of the moving robot 10 may be installed to be connected to the wire 1200. Meanwhile, although not shown in FIG. 1B, the charging device 100 may be installed in a partial region of the operation region 1000 including an region in which the wire 1200 is installed. Also, although not shown in FIG. 1B, the charging device 100 may be installed in a partial region of the operation region 1000 and a partial region of the external region 1100.

Hereinafter, an embodiment of a lawn mowing robot related to the present disclosure in a case where the moving robot 10 is the lawn mowing robot will be described with reference to FIGS. 10 and 1D.

Figure 1D:
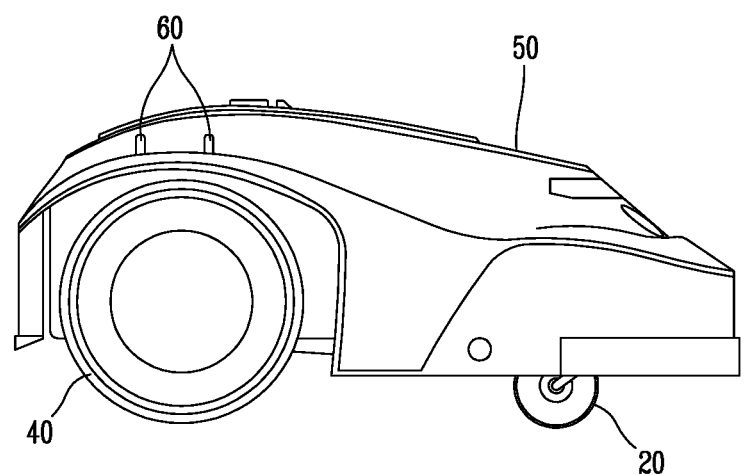
FIG. 1D is a conceptual view illustrating an embodiment of a moving robot.

Referring to FIGS. 10 and 1D, the lawn mowing robot 10 may include a body 50 prepared to be movable and cut the lawn. The body 50 may cut the lawn within the operation region 1000, while moving within the wire 1200.

Also, the wire 1200 may be connected to the charging device 100 capable of supplying a current to the wire 1200. That is, the wire 1200 may be connected to the charging device 100 and generate a magnetic field by a current supplied from the charging device 100. Also, the body 50 may be coupled to the charging device 100 so as to be charged.

The body 50 of the lawn mowing robot may have a blade unit (not shown) for cutting the lawn. A component for rotating a sharp blade of a knife may be disposed in the blade unit.

The body 50 may have a driving unit, and the driving unit may move and rotate the body 50 in a desired direction. The driving unit may include a plurality of rotatable wheels, and each of the wheels may be individually rotated and thus, the body 50 may be rotated in a desired direction. In detail, the driving unit may include at least one main driving wheel 40 and an auxiliary wheel 20. For example, the body 50 may include two main driving wheels 40 and the two main driving wheels 40 may be installed on a lower surface of a rear side of the body 50.

The body 50 may include a sensing unit for sensing the wire 1200. The sensing unit may sense a magnetic field generated by a current flowing in the wire 1200 and a voltage value induced and generated by the magnetic field, and obtain information regarding whether the body 50 has reached the wire 1200, whether the body 50 is present within a closed surface formed by the boundary wire 1200, whether the body 50 is traveling along the wire 1200, and the like.

Also, the sensing unit may sense various types of information regarding a movement distance of the body 50, a movement speed of the body 50, a change in relative position in accordance with movement, and the like.

The body 50 may drive the driving unit 40 using information sensed by the sensing unit. That is, a controller 18 may drive the driving unit such that the body 50 is positioned within the operation region by controlling traveling of the body 50 using measured information from the sensing unit.

The body 50 may include a sensing unit sensing a voltage value inducted from the wire 1200 and the controller 18 determining a distance between the body 50 and the wire 1200 by the voltage value sensed by the sensing unit.

The body 50 may include a power receiving unit 60 which comes into contact with the charging device 100 to receive power therefrom. The power receiving unit 60 may include at least one terminal. In detail, the terminal may be coupled to an elastic part (not shown) so as to be formed to movable vertically. The power receiving unit 60 may be installed on an upper side of any one of the main driving wheels 40 of the driving unit. Also, the power receiving unit 60 may be installed to be exposed upwardly from the body 50.

Figure 1E:
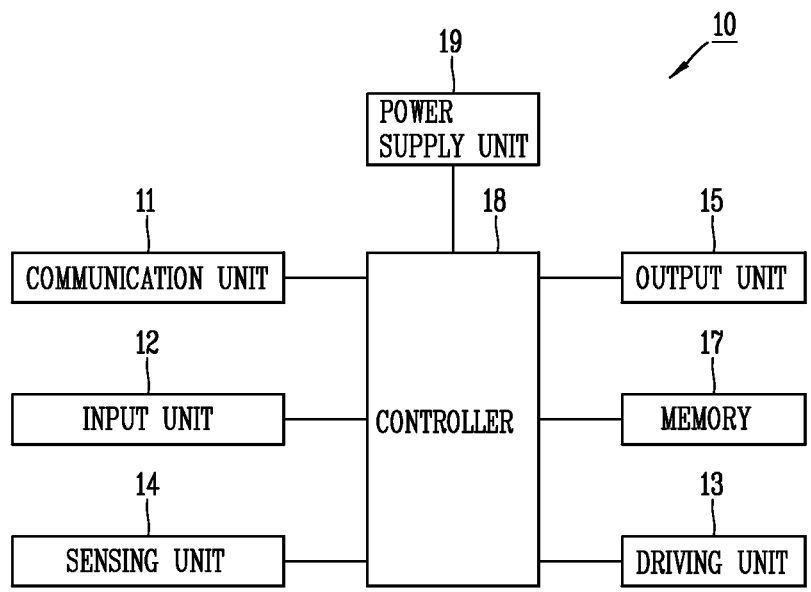
FIG. 1E is a block diagram illustrating a moving robot related to the present disclosure.

FIG. 1E illustrates an embodiment of a moving robot according to the present disclosure.

As illustrated in FIG. 1E, the moving robot 10 may include at least one of a communication unit 11, an input unit 12, a driving unit 13, a sensing unit 14, an output unit 15, a memory 17, a controller 18, and a power supply unit 19. The components illustrated in FIG. 1E are not essential in implementing the moving robot and the moving robot described in this disclosure may be a fewer or greater components.

In detail, among the components, the wireless communication unit 11 may include one or more modules allowing for wireless communication between the moving robot 10 and a wireless communication system, between the moving robot 10 and another moving robot, between the moving robot 10 and a mobile terminal (not shown), between the moving robot 10 and a communication unit (not shown) of the charging device 10, or between the moving robot 10 and an external server. Also, the communication unit 11 may include one or more modules connecting the moving robot 10 to one or more networks.

The communication unit 11 may include at least one of a mobile communication module, a wireless Internet module, a short-range communication module, and a position information module.

The input unit 12 may include a camera or an image input unit for inputting an image signal, a microphone or an audio input unit for inputting an audio signal, and a user input unit (e.g., a touch key, a push key (mechanical key), and the like) for receiving information from a user. Voice data or image data collected by the input unit 12 may be analyzed and processed as a control command of the user.

The sensing unit 14 may include one or more sensors for sensing at least one of information within a mobile terminal, information regarding a surrounding environment of a mobile terminal, and user information. For example, the sensing unit 14 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., a camera), a microphone, a battery gauge, an environmental sensor (e.g., a barometer, a hygrometer, a thermometer, a radioactivity sensor, a thermal sensor, a gas sensor, and the like), and a chemical sensor (e.g., an electronic nose, a healthcare sensor, a biometric sensor, and the like).

The sensing unit 14 may include at least two differently installed coils, and the two coils are able to sense a voltage value within the same region differentiated with respect to the wire 1200. That is, the two coils are able to sense a voltage value within a closed loop by the wire 1200.

Also, the sensing unit 14 includes a wheel sensor, and the wheel sensor may sense information related to operation history of at least one of the main driving wheels and the auxiliary driving wheel included in the driving unit 13.

Meanwhile, the moving robot disclosed in the present disclosure may combine pieces of information sensed by two or more sensors among these sensors to utilize the combined pieces of information.

The output unit 15, serving to generate an output related to sense of sight, sense of hearing, sense of touch, and the like, may include at least one of a display unit, an audio output unit, a vibration module, and a light output unit. The display unit may have an inter-layered structure or an integrated structure with a touch sensor in order to implement a touch screen. The touch screen may serve as a user input unit providing an input interface between the moving robot 10 and the user and provide an output interface between the moving robot 10 and the user.

Also, the memory 17 stores data supporting various functions of the moving robot 10. The memory 17 may store a plurality of application programs (or applications) driven in the moving robot 10, data for operation of the moving robot 10, and commands. At least some of the application programs may be downloaded from an external server through wireless communication. Also, at least some of the application programs may be present in the moving robot 10 at the timing when the moving robot 10 is released for basic functions (e.g., a cutting function, a moving function, a charging/discharging function, and a communication function) of the moving robot 10. Meanwhile, the application programs may be stored in the memory 17 and may be driven by the controller 18 to perform an operation (or a function) of the moving robot 10.

In addition to an operation related to the application programs, the controller 18 may generally control a general operation of the moving robot 10. The controller 18 may process a signal, data, information, and the like, input or output through the aforementioned components or drive an application program stored in the memory 17 to thus process or provide appropriate information or a function to the user.

Also, in order to drive the application programs stored in the memory 17, the controller 18 may control at least some of the components described above with reference to FIG. 1E. In addition, in order to drive the application programs, the controller 18 may combine two or more components included in the moving robot 10 to operate the moving robot 10.

The power supply unit 19 may receive external power or internal power and supply the power to each component included in the moving robot 10 under the control of the controller 18. The power supply unit 19 may include a battery, and here, the battery may be an internal battery or a replaceable battery.

At least some of the components may operate in cooperation in order to implement an operation, control, or a control method of the moving robot 10 according to various embodiments described hereinafter. Also, an operation, control, or control method of the moving robot 10 may be implemented in the moving robot 10 according to driving of at least one application program stored in the memory 17.

Hereinafter, an embodiment of a control method of a moving robot according to an embodiment of the present disclosure will be described with reference to FIG. 2.

Figure 2:
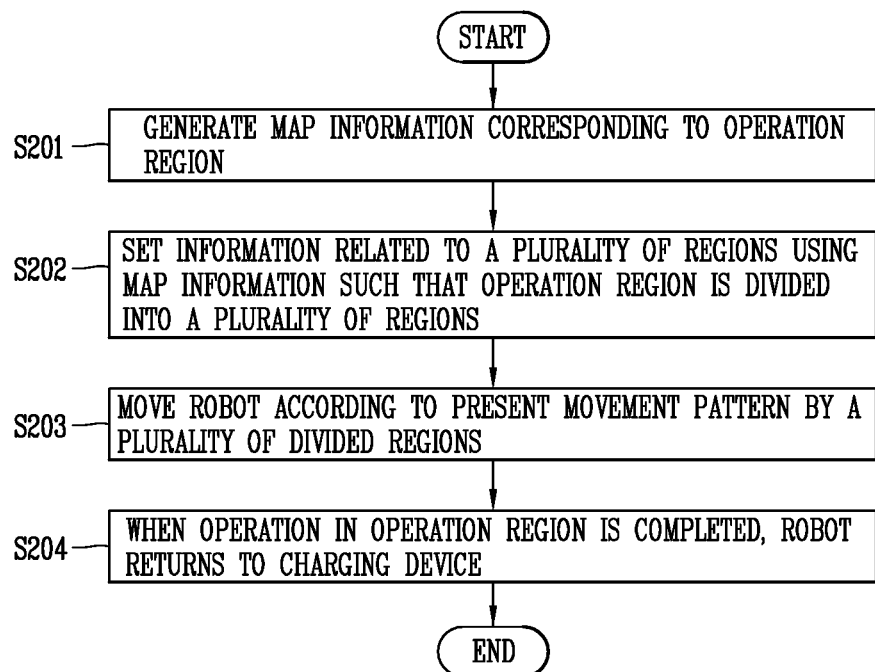
FIG. 2 is a flow chart illustrating an embodiment of a control method of a moving robot according to the present disclosure.

As illustrated in FIG. 2, the moving robot 10 may generate map information corresponding to an operation region (S201).

In detail, while the moving robot 10 is moving along the wire 1200 installed in the contour line of the operation region, a plurality of pieces of coordinate information related to a movement path of the moving robot 10 may be sensed. Also, the moving robot 10 may generate map information corresponding to the operation region using the plurality of pieces of sensed coordinate information.

Also, the moving robot 10 may set information related to a plurality of regions using the map information such that the operation region is divided into the plurality of regions (S202).

In detail, the controller 18 of the moving robot 10 may divide the operation region into a plurality of regions on the basis of a shape of the operation region. Also, the controller 18 may divide the operation region into a plurality of regions on the basis of information related to performance of the moving robot 10.

The moving robot 10 may move according to a preset movement pattern of each of the plurality of divided regions (S203).

Also, while moving along the preset movement pattern in each of the divided areas, the moving robot 10 may execute a lawn cutting function. In detail, the moving robot 10 may perform a lawn cutting function, while performing operation in a zigzag manner repeatedly for a predetermined number of times in each of the divided areas.

When the moving robot 10 completes the operation in the operation region, the moving robot 10 may return to the charging device 100 (S204).

Meanwhile, even before the operation in the operation region is completed, when a returning event occurs in the moving robot 10, the moving robot 10 may return to the charging device 100.

In the following disclosure, various embodiments related to the lawn mowing robot, as an example of the moving robot 10, will be described. That is, the moving robot 10, the robot 10, and the lawn mowing robot 10 correspond to each other, and the robot 10 and the lawn mowing robot 10 may include the components of the moving robot 10 illustrated in FIGS. 1A to 1E. However, the configuration of the present disclosure is not limited to the lawn mowing robot and may be applied to various moving robots.

FIGS. 3A to 3E illustrates an embodiment of a method for generating map information related to an operation region of a lawn mowing robot according to the present disclosure.

Figure 3A:
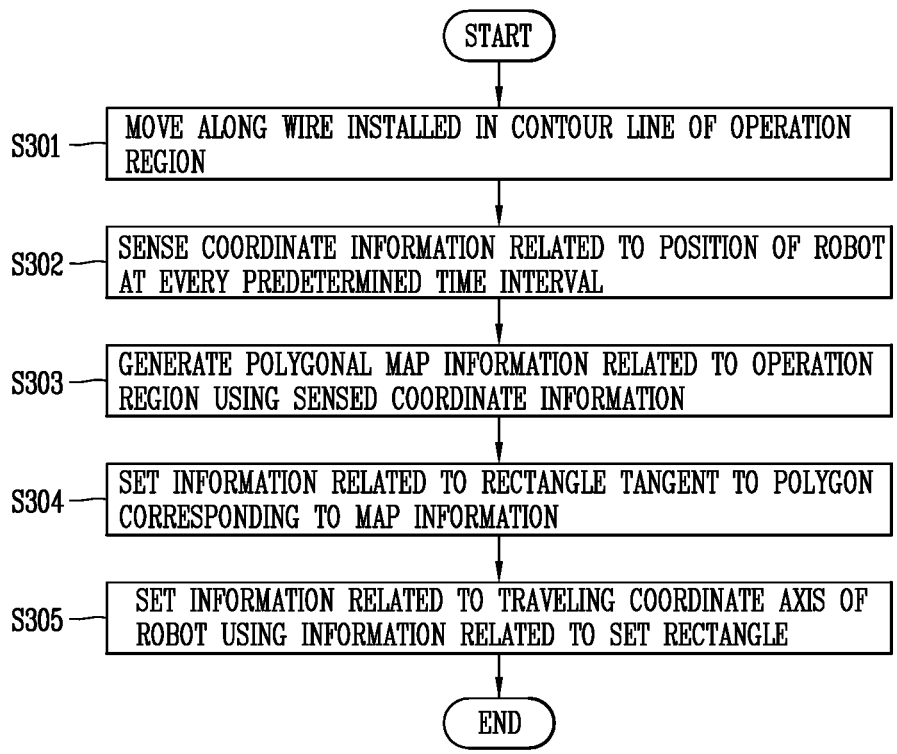
FIG. 3A is a flow chart illustrating an embodiment of a method for generating map information related to an operation region of a moving robot according to the present disclosure.

As illustrated in FIG. 3A, a driving unit 13 of the lawn mowing robot 10 may move along the wire 1200 installed in the contour line of the predetermined operation region 1000 (S301).

In detail, the driving unit 13 of the lawn mowing robot 10 may be driven such that the body of the lawn mowing robot 10 moves along the wire 1200. The driving unit 13 may be driven such that a center of gravity of the body of the robot is spaced apart from the wire 1200 by a predetermined distance.

For example, the driving unit 13 may drive the robot to move in a state in which any one of the main driving wheels of the robot is in contact with the wire 1200. Also, in another example, the driving unit 13 may drive the robot to move along a movement path corresponding to a closed loop formed by the wire 1200.

Meanwhile, the sensing unit 14 may sense a voltage value induced from the wire 1200, and the controller 18 may determine a distance between the body of the robot 10 and the wire 1200 using the sensed voltage value. In this manner, the controller 18 may control the driving unit on the basis of a determination result regarding the distance between the body and the wire.

Thereafter, the sensing unit 14 may sense coordinate information related to a position of the robot at every specific time interval.

In detail, the sensing unit 14 may sense coordinate information related to a current position of the robot at every time interval set by the user.

For example, the sensing unit 14 may include a wheel sensor or a gyro sensor sensing information related to at least one of an operational state and operation history of driving wheels included in the driving unit 13. Here, the information related to an operation state of the driving wheels may include information related to a current moving direction and movement speed.

Also, the wheel sensor may sense information related to operation history of the driving wheels, and the controller 18 may convert information sensed in relation to operation history of the driving wheels into coordinate information related to a current position of the robot using preset reference coordinate information.

In another example, the sensing unit 14 may include a GPS module sensing GPS coordinate information of the robot 10. In this case, although separate reference coordinate information is not set by the user, the sensing unit 14 may sense coordinate information related to a current position of the robot through the GPS module.

Figure 3B:
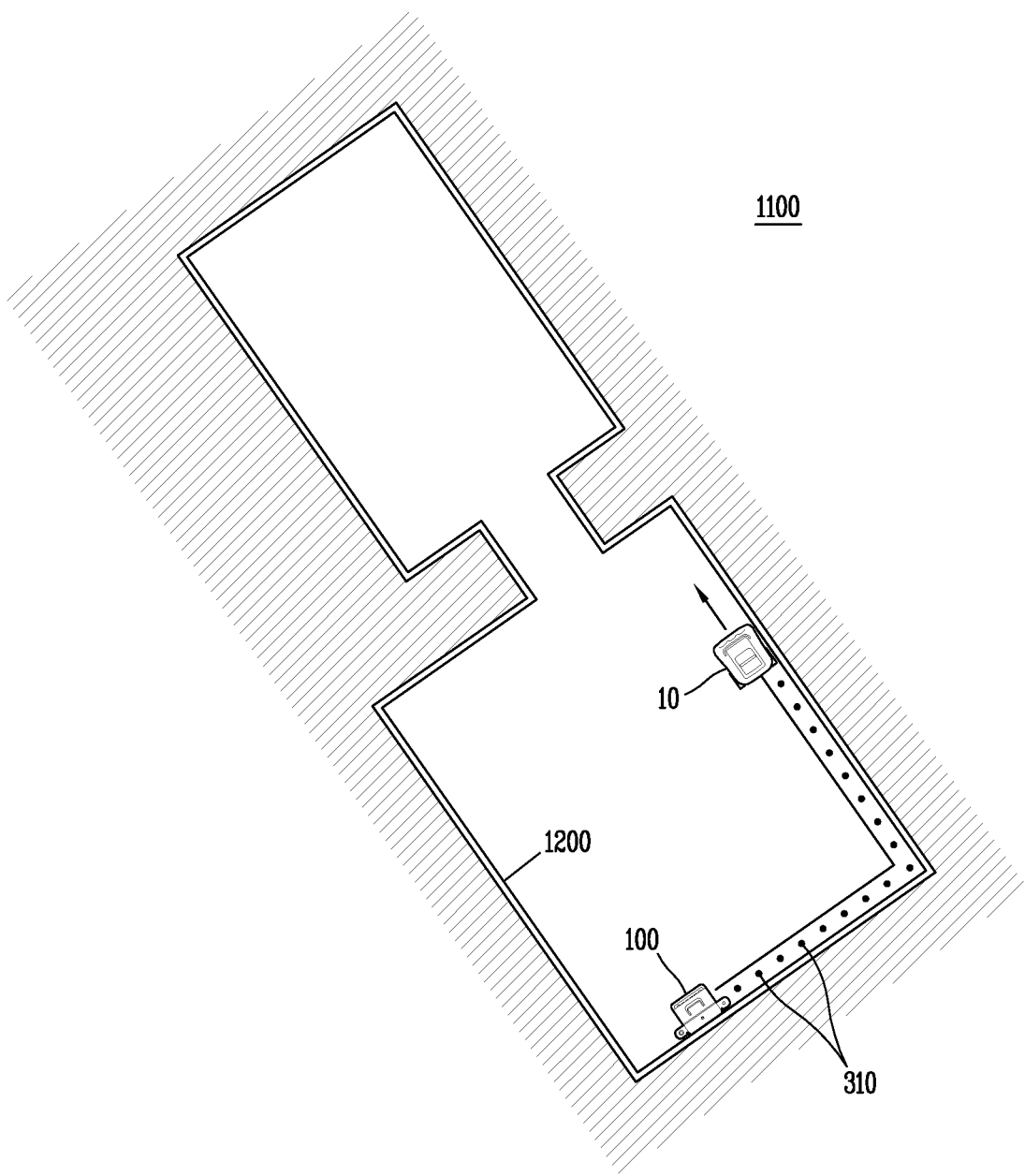
FIG. 3B is a conceptual view illustrating the embodiment illustrated in FIG. 3A.

In this connection, referring to FIG. 3B, as the robot 10 moves along the wire 1200, the sensing unit 14 may sense a plurality of pieces of coordinate information 310.

In an embodiment, a space between the pieces of coordinate information 310 may be changed according to an attribute of the sensing unit 14. In another embodiment, the controller 18 may control the sensing unit 14 to sense coordinate information at a specific period on the basis of a user input related to a sensing period of coordinate information.

Meanwhile, the controller 18 may convert coordinate information related to a current position of the robot sensed by the sensing unit 14 to generate coordinate information corresponding to a point (or a spot) where the wire is installed. In detail, the sensing unit 14 may sense first coordinate information corresponding to a center of gravity of the body and information related to a posture of the body at a timing when the first coordinate information was sensed. In this case, using the information related to the posture of the body, the controller 18 may convert the first coordinate information into second coordinate information corresponding to the point where the wire is installed. In this manner, the lawn mowing robot 10 according to the present disclosure may obtain a plurality of pieces of coordinate information corresponding to a plurality of points where the wire is installed.

Thereafter, the controller 18 may generate map information having a polygonal shape related to the operation region 1000 using the sensed coordinate information from the sensing unit 14 (S303).

In detail, the controller 18 may perform filtering on the plurality of pieces of sensed coordinate information 310 to select at least some of the plurality of pieces of coordinate information 310.

Figure 3C:
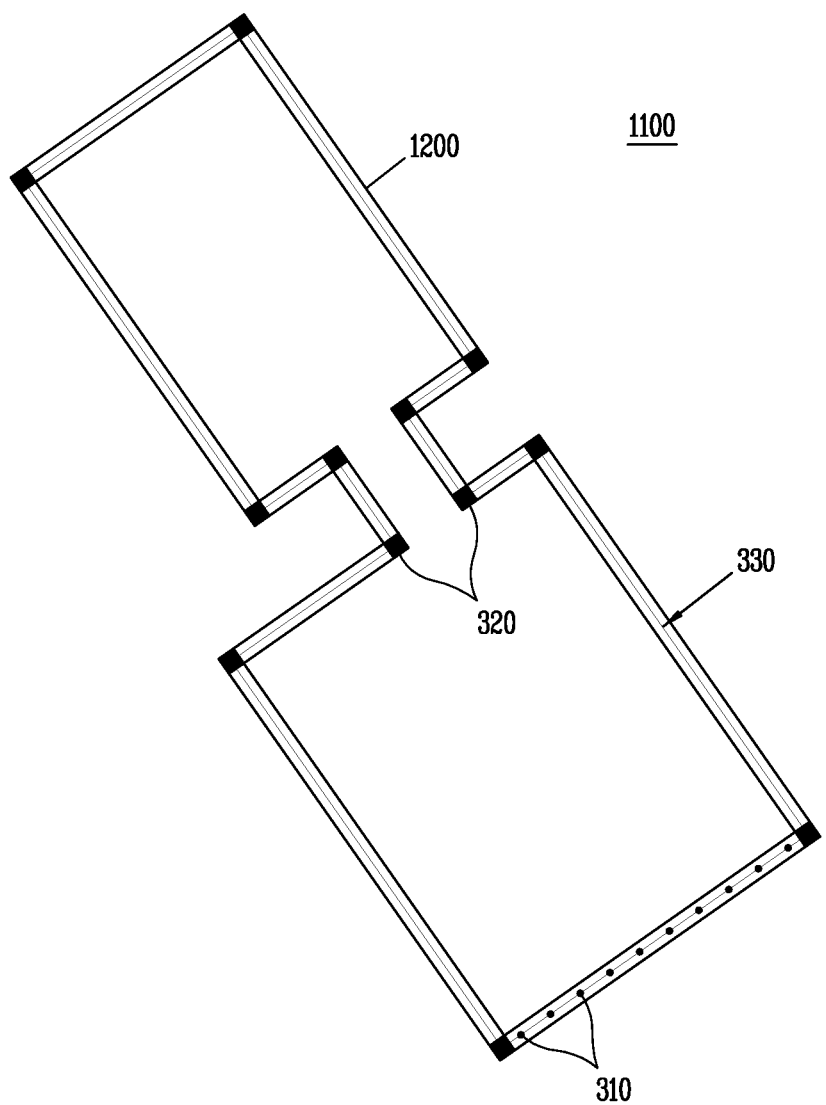
FIG. 3C is another conceptual view illustrating the embodiment illustrated in FIG. 3A.

In this connection, referring to FIG. 3C, the controller 18 may select some pieces of coordinate information 320 from among the plurality of pieces of coordinate information 310 from the sensing unit 14.

In detail, the controller 18 may set information related to segments sequentially connecting the plurality of pieces of coordinate information 310 on the basis of order in which the plurality of pieces of coordinate information 310 are sensed by the sensing unit 14. Accordingly, the controller 18 may group the plurality of pieces of coordinate information 310 into a plurality of groups using the information related to the segment.

For example, controller 18 may group some of the plurality of pieces of coordinate information 310 substantially forming a straight line into the same group. In this manner, the controller 18 may select pieces of coordinate information positioned at both ends among the pieces of grouped information.

In another example, the controller 18 may detect information related to a plurality of segments formed by two pieces of adjacent coordinate information among the plurality of pieces of coordinate information 310. Also, the controller 18 may perform filtering on the plurality of pieces of coordinate information 310 using information related to an angle formed by the plurality of detected segments. The controller 18 may select at least some of the plurality of pieces of coordinate information 310 on the basis of a result of the performed filtering.

In addition, the controller 18 may generate a polygonal map 330 using the selected coordinate information 310. That is, the controller 18 may generate the polygonal map information 330 including some of the plurality of pieces of coordinate information 310 as vertices.

Meanwhile, when the body of the robot 10 returns to a reference point from which the coordinate information 310 started to be sensed after moving along the wire 1200 forming a closed loop, the controller 18 may determine that generation of the map information related to the operation region is completed. In this case, the reference point may correspond to a point where the charging device 100 of the robot 10 is installed.

In an embodiment, when the robot 10 circulatedly moves along the closed loop by a preset number of times, the controller 18 may determine that generation of the map information has been completed. Accordingly, accuracy of the generated map information may be enhanced.

Thereafter, the controller 18 may set information related to a rectangle tangent to a polygon corresponding to the generated map information (S304). Also, the controller 18 may set information related to a traveling coordinate axis of the robot 10 using the set information related to the rectangle (S305).

Figure 3D:
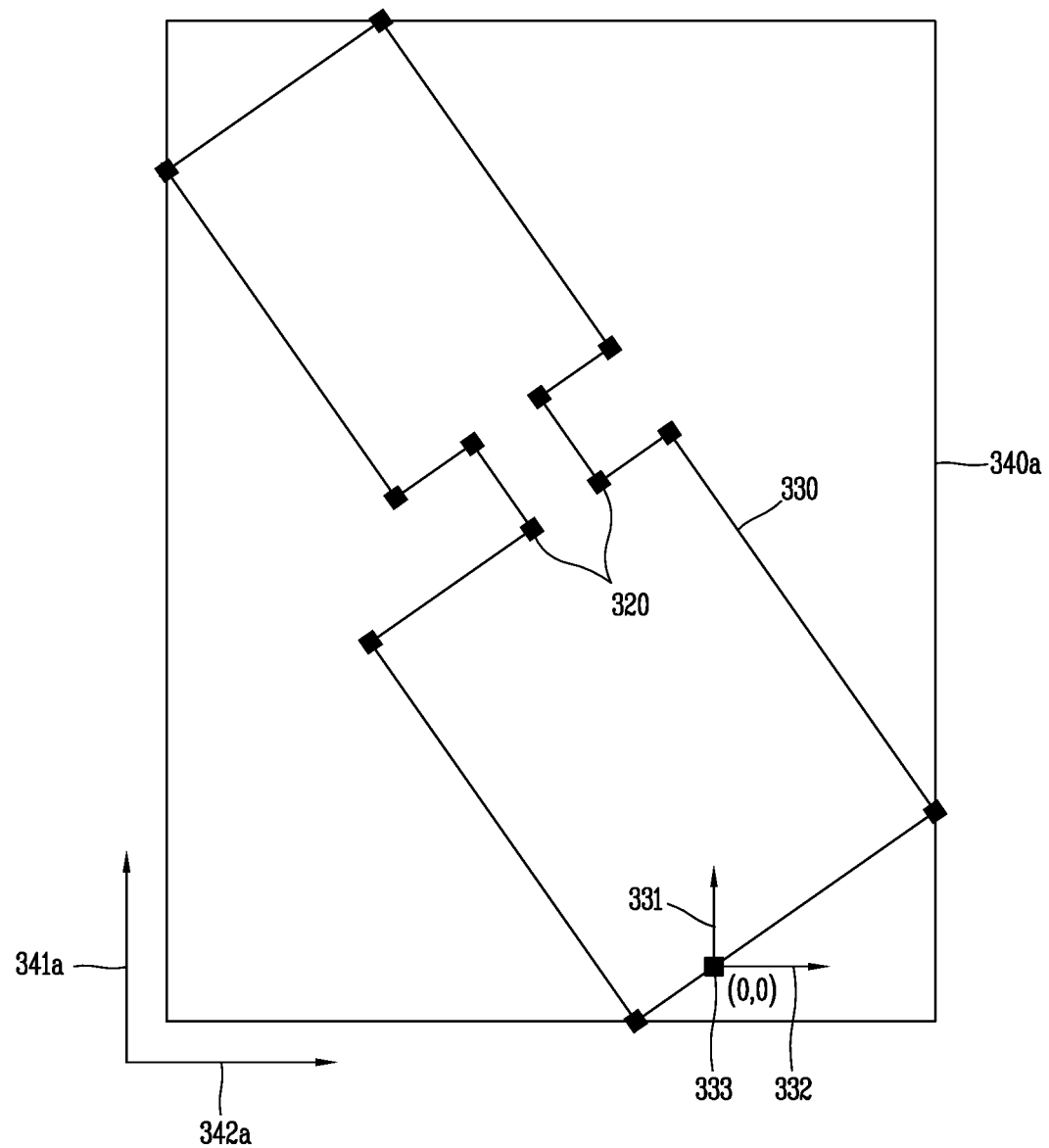
FIG. 3D is yet another conceptual view illustrating the embodiment illustrated in FIG. 3A.

In detail, referring to FIG. 3D, the controller 18 may set information related to coordinate axes 331 and 332 corresponding to the generated map information. In addition, the controller 18 may set coordinate information 333 related to the reference point corresponding to the operation region.

For example, coordinate axis information corresponding to the map information may be global coordinate axis information. That is, the coordinate axis information corresponding to the map information may relate to a coordinate axis corresponding to a vertical direction and a coordinate axis corresponding to a horizontal direction.

In addition, as illustrated in FIG. 3D, the controller 18 may set information 340*a* related to a rectangle tangent to the polygon corresponding to the generated map information.

In detail, the controller 18 may set the information 340*a* related to the rectangle circumscribed about the polygon corresponding to the map information in at least four points of contact. The controller 18 may set information related to the traveling coordinate axes 341*a* and 342*a* of the robot 10 using the information 340*a* related to the circumscribed rectangle.

In this case, the controller 18 may determine a traveling direction of the robot 10 using the information related to the set traveling coordinate axes 341*a* and 342*a*.

Figure 3E:
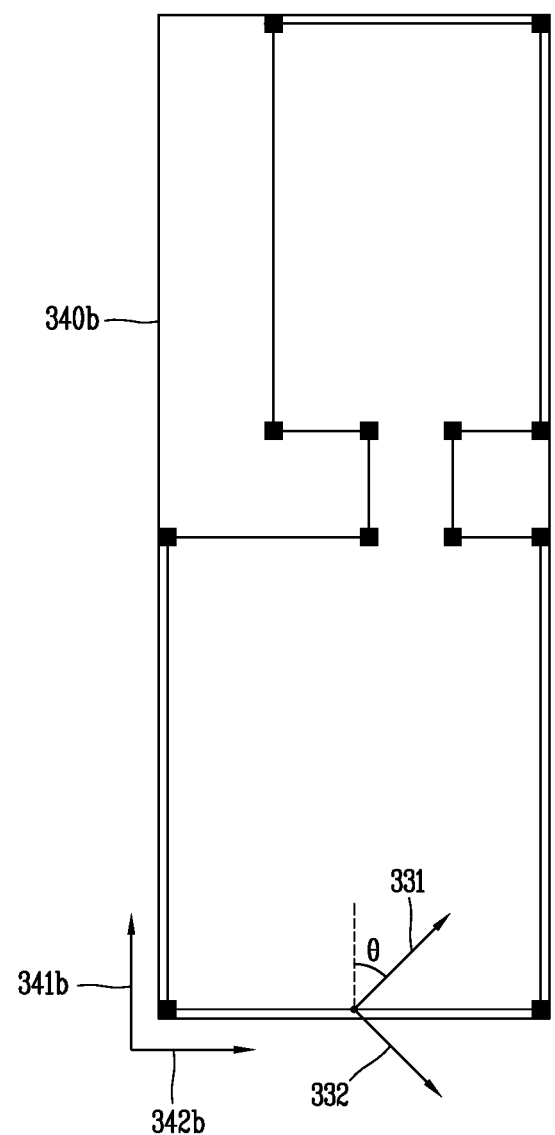
FIG. 3E is still yet another conceptual view illustrating the embodiment illustrated in FIG. 3A.

Also, referring to FIG. 3E, the controller 18 may calculate a difference in area between the polygon corresponding to the map information and the circumscribed rectangle. The controller 18 may set information related to the rectangle such that the calculated difference in area has a minimum value.

In detail, while rotating the traveling coordinate axes 341*a* and 342*a*, the controller 18 may reset information related to the rectangle 340*b* which corresponds to the rotated traveling coordinate axes and which is circumscribed about the polygon corresponding to the map information 330.

In this manner, the controller 18 may detect a difference (θ) in angle between the traveling coordinate axes 341*b* and 342*b* and the coordinate axes 331 and 332 related to the map information minimizing the difference in area between the polygon and the rectangle.

In an embodiment, the controller 18 may detect the angle (θ) minimizing the difference in area between the polygon and the rectangle, while rotating the traveling coordinate axes 341*b* and 342*b* by 1° each time.

In this manner, the controller 18 may set information related to the rectangle circumscribed about the polygon and the traveling coordinate axes 341*a* and 342*a* corresponding to the rectangle, and the memory 17 may store the information related to lengths of the first and second sides of the rectangle, together with the set information.

In this case, the controller 18 may control the driving unit 13 such that the robot 10 reciprocates in the second traveling coordinate axis 342*a* direction, while moving in the first traveling coordinate axis 341*a*. Also, the controller 18 may control the driving unit 13 such that the robot 10 reciprocates in the second traveling coordinate axis 342*a*, traveling in a zigzag manner.

Hereinafter, an embodiment in which the lawn mowing robot according to the present disclosure divides an operation region into a plurality of regions and performing an operation by the plurality of regions will be described with reference to FIGS. 4A to 4G.

In the control method of the lawn mowing robot described in the following embodiment, the information related to traveling coordinate axes 400*a* and 400*b* set by the control method described above with reference to FIG. 3A may be used or information related to traveling coordinate axes 400*a* and 400*b* directly set by the user. Also, in the control method of the lawn mowing robot described in the following embodiment, reference coordinate information corresponding to a position where the charging device is installed may be used.

First, the controller 18 may set first information related to at least one reference line using coordinate information corresponding to a vertex of a polygon forming an operation region (S401).

Figure 4A:
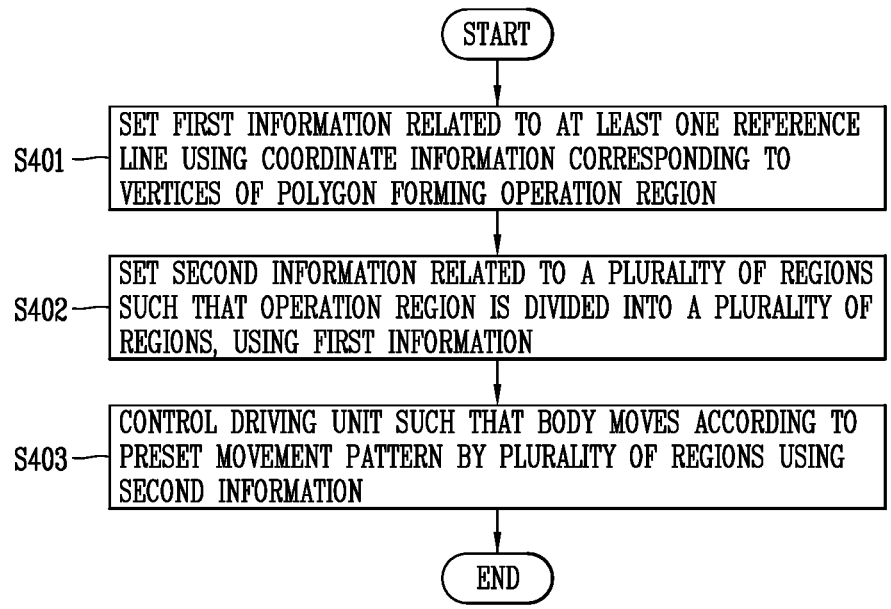
FIG. 4A is a flow chart illustrating an embodiment of a method for dividing an operation region of a moving robot into a plurality of regions according to the present disclosure.
Figure 4B:
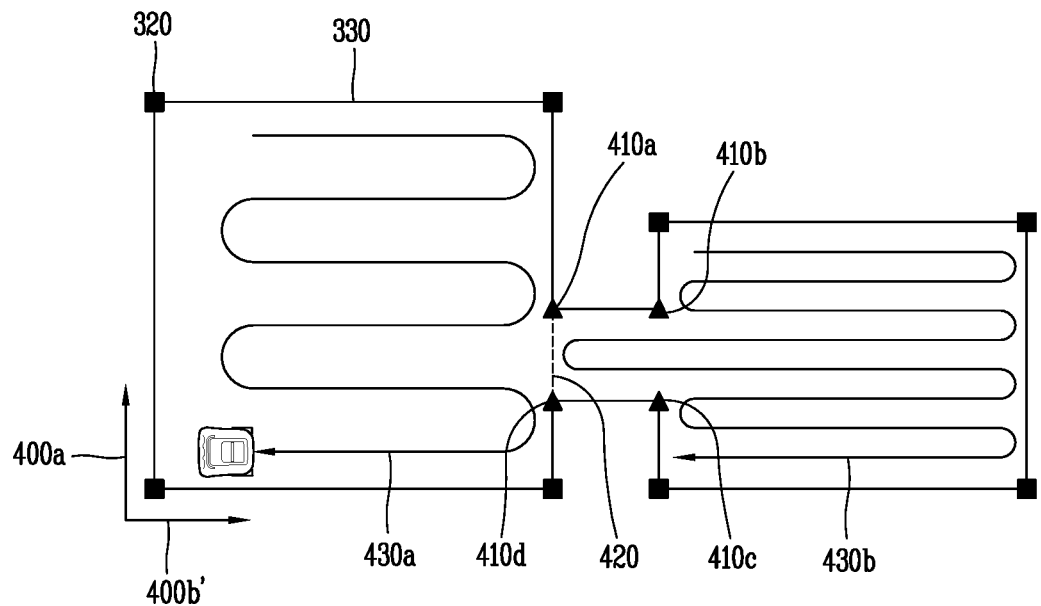
FIG. 4B is a conceptual view illustrating the embodiment illustrated in FIG. 4A.

In detail, referring to FIG. 4B, the controller 18 may detect coordinate information corresponding to concave vertices 410*a*, 410*b*, 410*c*, and 410*d* among the vertices of the polygon using map information 330 related to the polygon forming the operation region. The controller 18 may set the first information using the detected coordinate information corresponding to the concave vertices.

That is, the controller 18 may set first information related to at least one reference line 420 using the coordinate information corresponding to the concave vertices. For example, the first information may include information related to an angle formed by the reference line 420 and a traveling coordinate axis, coordinate information of the concave vertex 410*a* included in the reference line 420. In another example, the reference line 420 may include a concave vertex and may be parallel to any one of preset traveling coordinate axes.

Figure 4C:
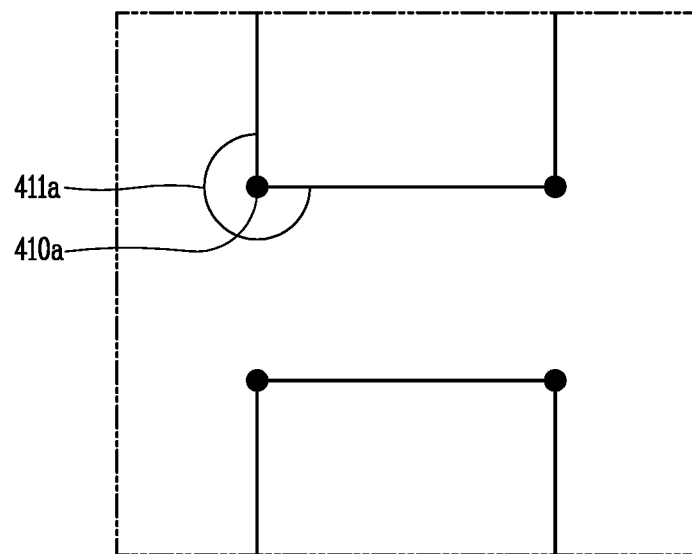
FIG. 4C is another conceptual view illustrating the embodiment illustrated in FIG. 4A.

For example, referring to FIG. 4C, an internal angle 411*a* of the polygon formed around the concave vertex 410*a* may be an obtuse angle. That is, the controller 18 may set first information related to the concave vertex 410 in order to select the vertex by which the internal angle of the polygon is an obtuse angle, among a plurality of vertices of the polygon.

Thereafter, the controller 18 may set second information related to a plurality of regions such that the operation region is divided into a plurality of areas, using the first information.

The controller 18 may set first information related to at least one reference line dividing the operation region into a plurality of areas. Also, the controller 18 may set second information related to a plurality of regions such that the operation region is divided into a plurality of areas, using the at least one reference line.

For example, the second information may include coordinate information corresponding to a vertex positioned in the boundary of the divided areas, identification information of each of the divided areas, and information related to an area of each of the divided regions.

The controller 18 may set information related to at least one reference line dividing the operation region into a plurality of regions using coordinate information corresponding to the selected concave vertex.

In detail, the controller 18 may compare coordinate information corresponding to at least one concave vertices 410*a*, 410*b*, 410*c*, and 410*d* and coordinate information related to a rectangle (please refer to FIG. 3E) tangent to the polygon forming the operation region and select any one of the at least one concave vertices.

That is, on the basis of a distance between the at least one concave vertex included in the polygon forming the operation region and one side of the rectangle, the controller 18 may select any one of the at least one concave vertex. For example, the controller 18 may select a concave vertex farthest from one side of the rectangle among the at least one concave vertex. In another example, one side of the rectangle may be parallel to any one of traveling coordinate axes of the robot.

Here, the controller may set information related to a reference line which includes the selected concave vertex and which is related to a reference line perpendicular to the traveling coordinate axis 400*b*. In addition, the controller 18 may divide the operation region using the reference line perpendicular to the traveling coordinate axis.

Meanwhile, the controller 18 may determine whether to divide the operation region by comparing a distance value from the at least one concave vertex to a first side of the rectangle and a length value of a second side of the rectangle perpendicular to the first side thereof.

That is, when a distance value from any one of the at least one concave vertex to the first side of the rectangle is 10% or greater of the length value of the second side perpendicular to the first side of the rectangle, the controller 18 may set the second information such that the operation region is divided on the basis of the any one concave vertex.

Also, in a case where a distance value from any one of the at least one concave vertex to the first side of the rectangle is less than a preset percentage value of the length value of the second side of the rectangle perpendicular to the first side, the controller 18 may not divide the operation region on the basis of the any one concave vertex. For example, the preset percentage value may be 10%.

The controller 18 may select any one of at least one reference line using third information related to a preset traveling direction. In addition, the controller 18 may set second information related to a plurality of regions included in the operation region using the first information related to the selected reference line.

Here, the third information may include pieces of coordinate axis information 341a and 342a related to a rectangle tangent to a polygon forming an operation region described above with reference to FIG. 3E. That is, the controller 18 may detect a rectangle having a minimum area difference from the polygon forming the operation region, and subsequently set a horizontal side direction and a vertical side direction of the rectangle as traveling directions of the robot.

Also, the controller 18 may select any one of at least one reference line perpendicular to a preset traveling direction. In this manner, the controller 18 may set second information related to a plurality of regions included in the operation region.

That is, the controller 18 may set second information related to the plurality of regions such that the operation region may be divided into a plurality of regions, using a reference line including the any one concave vertex and being perpendicular to a preset driving coordinate axis.

Meanwhile, when a plurality of concave vertices are detected, the controller 18 may group the plurality of concave vertices to at least one group, and select a concave vertex most distant from one side of the rectangle in each group. Also, the controller 18 may set second information related to a plurality of regions such that the operation region may be divided into the plurality of regions, using a reference line including the concave vertex selected in each group.

Meanwhile, when it is determined that there is no concave vertex among vertices of the polygon forming the operation region, the controller 18 may set the second information such that the operation region may be divided into a plurality of regions, using fourth information related to a predetermined maximum traveling distance value. When a maximum width value of the operation region in a preset traveling direction is greater than the maximum traveling distance value, the controller 18 may set information related to a reference line perpendicular to the preset traveling direction and divide the operation region into a plurality of regions.

For example, the maximum traveling distance value may be set to 20 meters. In another embodiment, the controller 18 may set information related to the maximum traveling distance value on the basis of a user input.

Figure 4D:
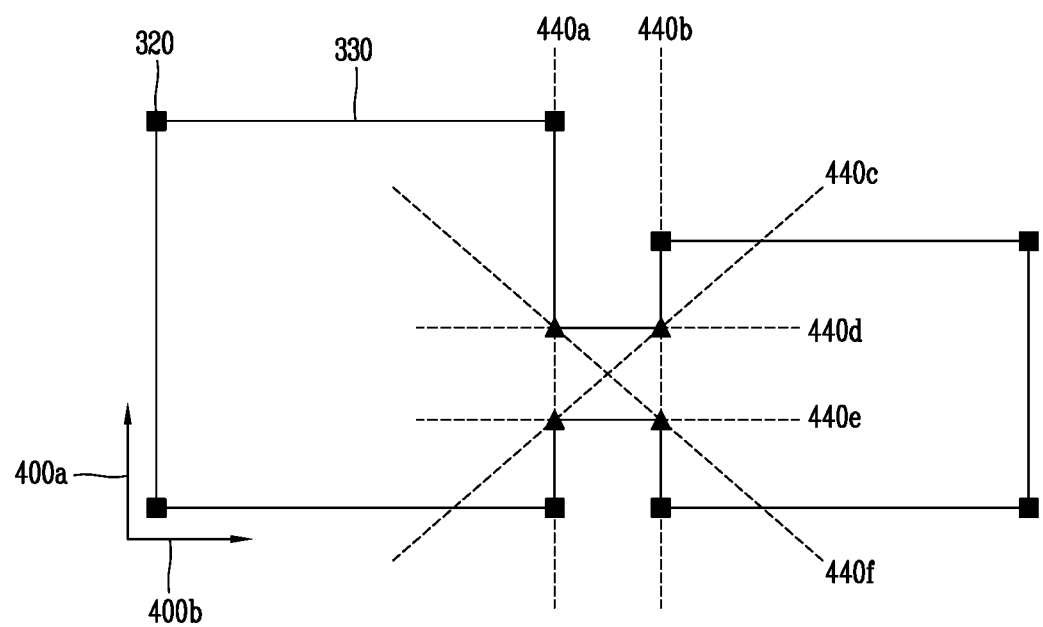
FIG. 4D is yet another conceptual view illustrating the embodiment illustrated in FIG. 4A.

In an embodiment, referring to FIG. 4D, the controller 18 may set first information related to at least one reference line 440a, 440b, 440c, 440d, 440e, and 440f including some of concave vertices, using coordinate information related to the selected concave vertices. 410a, 410b, 410c, and 410d.

Figure 4E:
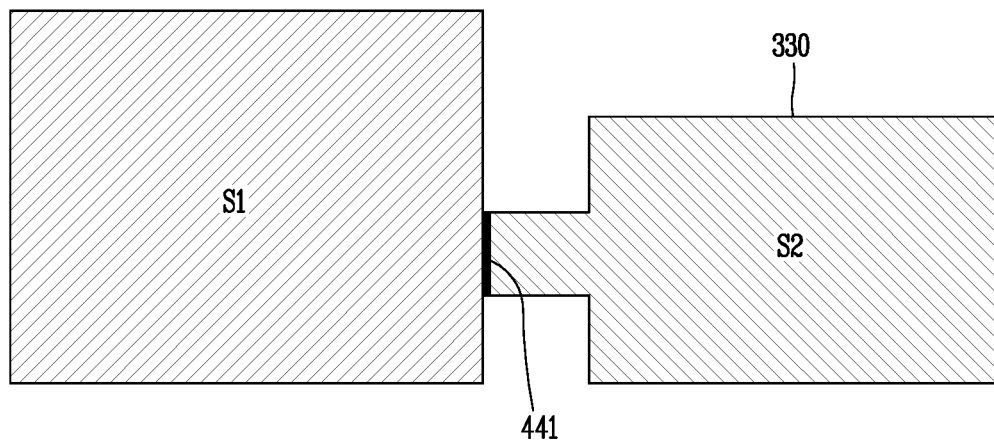
FIG. 4E is yet another conceptual view illustrating the embodiment illustrated in FIG. 4A.

Also, referring to FIG. 4E, the controller 18 may set second information related to a plurality of regions S1 and S2 such that the operation region may be divided into a plurality of regions, using the first information related to a reference line 441.

Thereafter, the controller 18 may control the driving unit such that body may move according to a preset movement pattern in each of the plurality of regions using the second information (S403).

In detail, as illustrated in FIG. 4B, the controller 18 may control the driving unit such that the body of the robot 10 may move according to a preset movement pattern by the plurality of divided regions using the set second information. The controller 18 may control a blade unit included in the driving unit to perform a cutting operation by the plurality of divided regions, while the robot 10 is moving.

For example, the controller 18 may control the driving unit 13 such that the robot 10 moves in a zigzag manner 430a with respect to a preset traveling direction in the first region S1, and control the driving unit 13 such that the robot 10 moves in a zigzag manner 430b in the second region S2.

In another example, the controller 18 may control the driving unit 13 on the basis of information related to different movement patterns in the first region and the second region. In another example, the controller 18 may set information related to a movement pattern regarding movement of the robot 10 by the plurality of regions included in the operation region on the basis of a user input.

In another example, the controller 18 may set coordinate information related to an operation start point of the robot 10 regarding each of the plurality of regions S1 and S2 included in the operation region. In detail, the controller 18 may set a position corresponding to a vertex whose coordinate value is maximal or minimal regarding any one of preset traveling coordinate axes 400a and 400b, as an operation start point of the robot 10.

In another example, when the robot 10 arrives at the operation start point, the controller 18 may change a posture of the robot 10 such that a moving direction of the robot 10 is parallel to any one of the preset traveling coordinate axes 400a and 400b. In this case, the controller 18 may control the driving unit 13 such that a posture of the robot 10 is parallel to any one of the traveling coordinate axes.

Figure 4F:
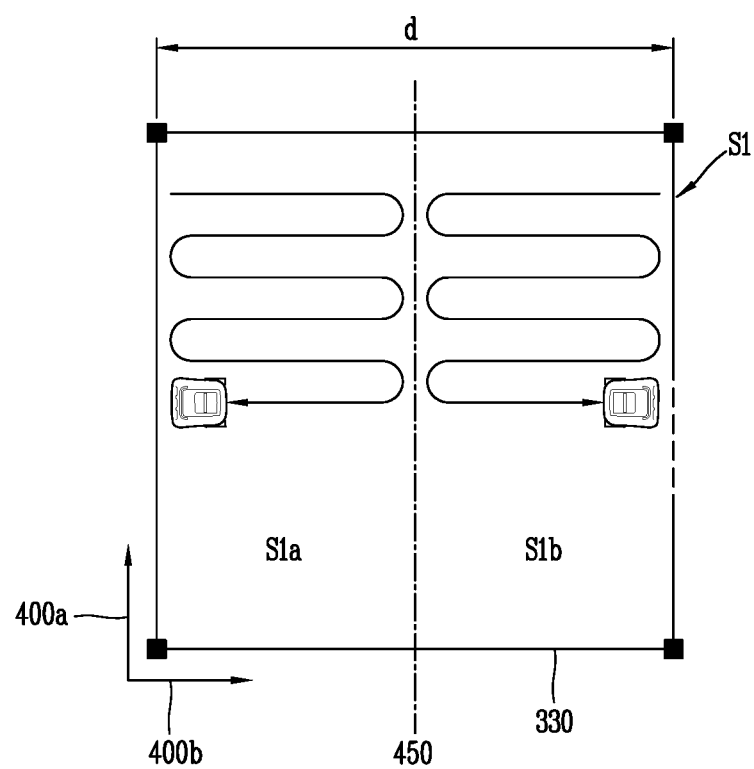
FIG. 4F is yet another conceptual view illustrating the embodiment illustrated in FIG. 4A.

In an embodiment, as illustrated in FIG. 4F, when a maximal length of the preset traveling direction 400b in the divided region S1 is greater than a predetermined maximum traveling distance value, the controller 18 may reset the second information such that the divided region S1 is divided into a plurality of sub-regions S1a and S1b.

In detail, referring to FIG. 4F, the controller 18 may compare coordinate information corresponding to a plurality of vertices included in the divided region S1 in the operation region to calculate a maximum length of the divided region with respect to the preset traveling direction 400b. When the calculated maximum length of the divided region is greater than a predetermined maximum traveling distance value d, the controller 18 may reset the second information in order to divide the divided region into a plurality of sub-regions.

For example, the reset second information may include at least one of information related to a contour line of a sub-region, information related to a vertex forming the sub-region, and information related to an additional reference line 450 defining the sub-region.

In another example, the maximum traveling distance value may be 20 meters.

In another example, the controller 18 may set information related to the maximum traveling distance value on the basis of a user input.

In detail, the controller 18 may change the maximum traveling distance value on the basis of information related to at least one of sensitivity and accuracy of the sensing unit sensing a posture of the robot. Also, the controller 18 may change the maximum traveling distance value on the basis of information related to an attribute of the blade unit. For example, when accuracy of the sensing unit is increased or a length of the blade unit is increased, the controller 18 may increase the maximum traveling distance value.

In addition, the controller 18 may set information related to the number of the sub-regions using at least one of a maximum length of the polygon in a preset traveling direction and the predetermined maximum traveling distance value.

In detail, the controller 18 may determine the number of the sub-regions using a value obtained by dividing the maximum length value of the polygon in the preset traveling direction by the predetermined maximum traveling distance value. For example, in a case where the maximum length value in the traveling direction is d and the predetermined maximum traveling distance is A, the number n of the sub-regions may be a minimum integer greater than a d/A value.

Meanwhile, although not shown in FIG. 4F, the controller 18 may determine whether to re-divide the divided region S1 into sub-regions using information related to an area of the divided region S1. That is, using a predetermined reference value related to an area, the controller 18 may reset the second information such that the divided region is re-divided into sub-regions only when the divided region exceeds the reference value.

Figure 4G:
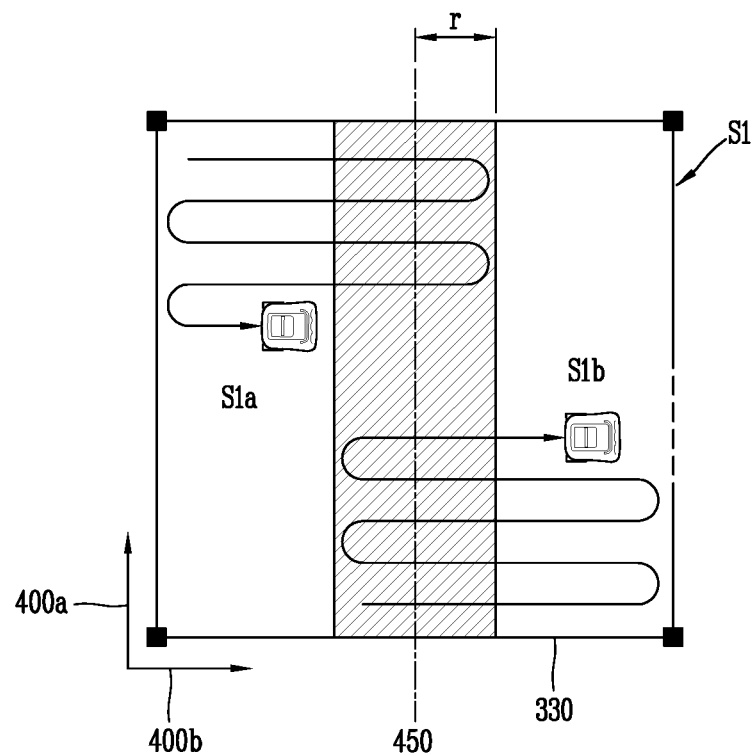
FIG. 4G is still yet another conceptual view illustrating the embodiment illustrated in FIG. 4A.

Also, as illustrated in FIG. 4G, the controller 18 may control the driving unit such that the body moves along the preset movement pattern up to a region spaced apart by a predetermined additional traveling distance r from the contour line of the divided region.

In detail, in a case where the robot 10 is moving on the basis of the preset movement pattern regarding the divided region S1 or the sub-regions S1a and S1b re-divided from the divided region, the controller 18 may detect information related to the contour line of the region in which the robot 10 is moving, using the set second information. The controller 18 may control the driving unit 13 such that the robot 10 may move up to the region spaced apart from the contour line by the predetermined additional traveling distance r.

Here, the controller 18 may set the additional traveling distance r value using a maximum length value of the region in which the robot 10 is moving in the preset traveling direction. For example, the additional traveling distance r value may be included within a range of 5% to 10% of the maximum length value in the traveling direction. In another example, the controller 18 may set the additional traveling distance r value on the basis of a user input.

As illustrated in FIG. 4G, in the control method of the present disclosure, an effect of enhancing throughput regarding the operation region is obtained by running the robot up to the region overlapping by the additional traveling distance from the region corresponding to the set second information.

Hereinafter, an embodiment in which a moving robot returns to a specific point of an operation region according to the present disclosure will be described with reference to FIGS. 5A to 5D.

Figure 5A:
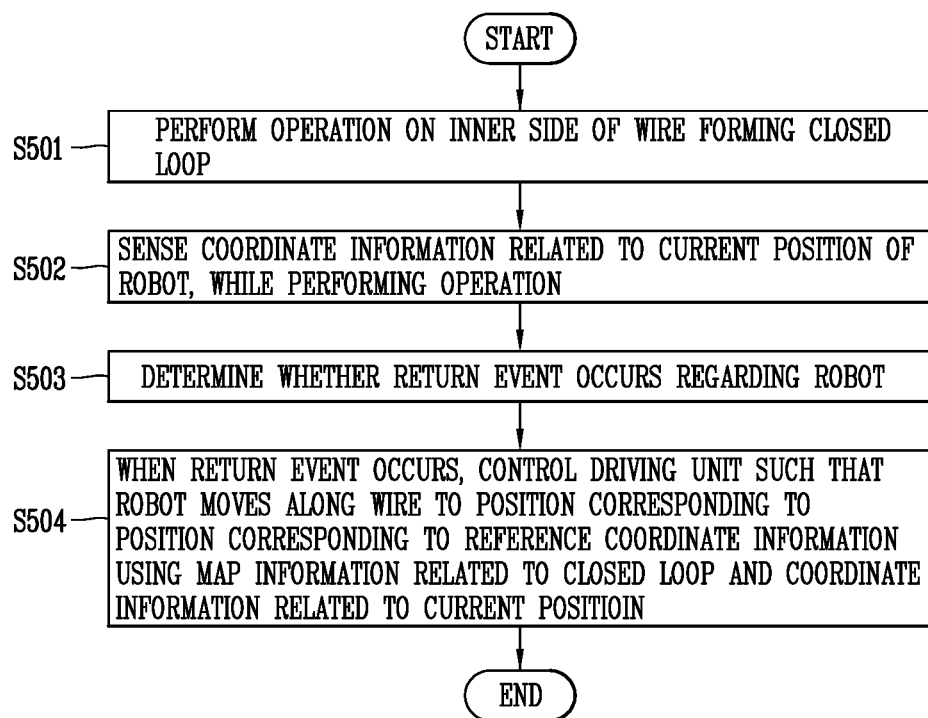
FIG. 5A is a flow chart illustrating an embodiment of a method for returning a moving robot to a specific point (or a specific spot) of an operation region according to the present disclosure.

As illustrated in FIG. 5A, the controller 18 may control the driving unit 13 such that the body of the robot 10 moves on an inner side of the wire forming a closed loop (S501).

In detail, the controller 18 may control the driving unit 13 such that the body of the robot 10 moves on an inner side of the wire installed to define the contour line of the operation region.

Here, the memory 17 may store map information including coordinate information related to the closed loop. For example, the map information may be generated by the control method illustrated in FIG. 3A.

Thereafter, the controller 18 may control the sensing unit 14 to sense coordinate information related to a current position of the robot 10 in real time while the robot 10 is performing an operation (S502).

Accordingly, the memory 17 may store coordinate information related to the current position of the robot 10 sensed in real time.

In detail, the sensing unit 14 may sense coordinate information related to the current position of the robot 10 by sensing information related to operation history of the driving unit 13 at every predetermined time interval. Also, using preset reference coordinate information together with the information related to the sensed operation history of the driving unit 13, the controller 18 may detect coordinate information related to a position of the robot 10 relative to the position corresponding to the reference coordinate information.

Figure 5B:
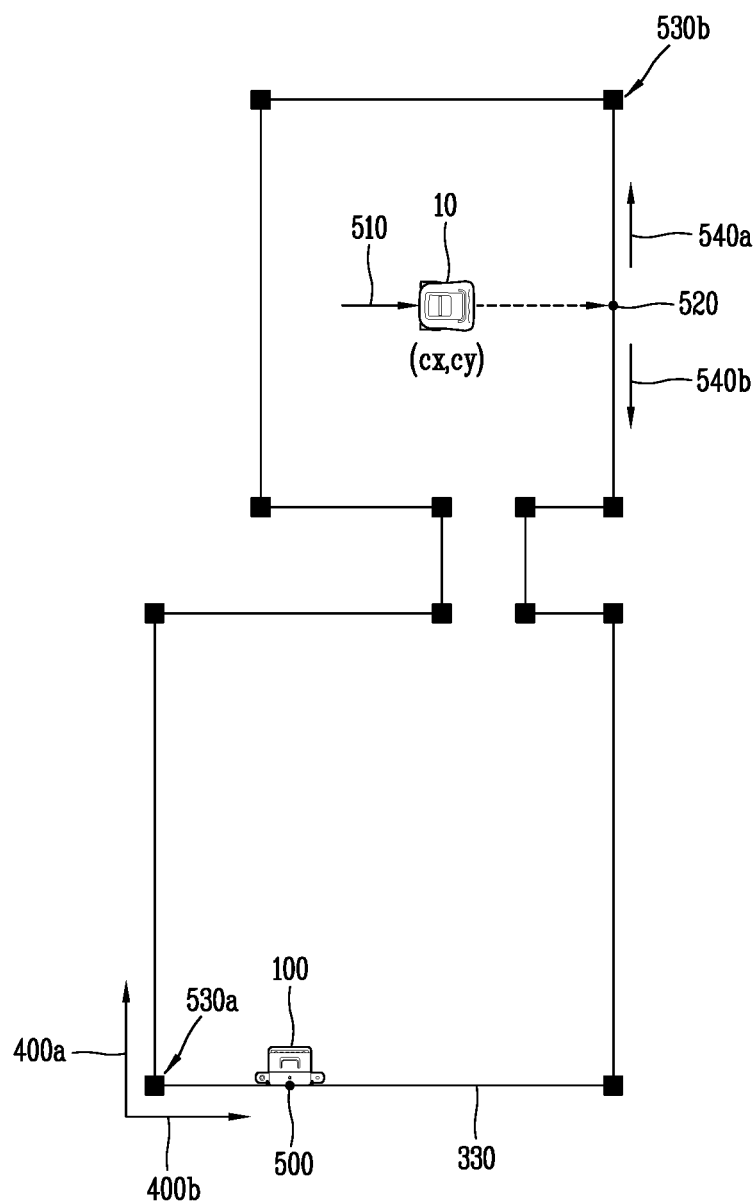
FIG. 5B is a conceptual view illustrating the embodiment illustrated in FIG. 5A.

In this connection, referring to FIG. 5B, the memory 17 may store at least one of map information 330 related to the polygon forming the operation region of the robot 10, coordinate information 530a and 530b related to vertices of the polygon, information related to the traveling coordinate axes 400a and 400b of the robot 10, coordinate information (cx, cy) related to the current position of the robot 10, preset reference coordinate information 500, and a current moving direction of the robot.

Thereafter, the controller 18 may determine whether a return event occurs with respect to the robot 10 (S503).

In detail, in an embodiment, the controller 18 may detect information related to a remaining amount of power stored in the power supply unit 19 supplying power to the robot 10. When the remaining amount of power is less than a predetermined reference value using the detected information, the controller 18 may determine that the return event has occurred.

The power supply unit 19 may be a rechargeable battery, for example.

In another example, the controller 18 may set information related to a predetermined reference value using a user input.

In another example, the controller 18 may change the predetermined reference value on the basis of a distance between the coordinate information related to the current position of the robot 10 and the reference coordinate information 500. That is, when a distance between the coordinate information related to the current position and the reference coordinate information 500 is increased, the controller 18 may increase the predetermined reference value.

Here, the reference coordinate information 500 may correspond to information related to a position where the charging device 100 of the robot 10 is installed.

In another embodiment, the controller 18 may detect information regarding whether the communication unit 11 of the robot 10 performing wireless communication receives a signal related to a recall command. When the communication unit 11 receives the signal related to a recall command, the controller 18 may determine that the return event has occurred.

Here, the signal related to the recall command may be transmitted from a communication device (not shown) of the charging device 100 or may be transmitted on the basis of a user input from a remote controller (not shown).

In another embodiment, the sensing unit 14 may sense information related to a breakdown of the robot 10. Here, the controller 18 may determine whether the robot 10 is broken down using information related to a breakdown of the robot sensed by the sensing unit. Also, when it is determined that the robot 10 is broken down, the controller 18 may determine that the return event has occurred.

In detail, the sensing unit 14 may sense information related to an operational state of the driving unit 13 of the robot 10. The controller 18 may determine whether the driving unit 18 is broken down using the information related to the operational state of the driving unit 13. For example, on the basis of the information sensed by the sensing unit 14, the controller 18 may determine whether at least one of the main driving wheel, the auxiliary driving wheel, and the blade unit included in the driving unit 13 on the basis of the information sensed by the sensing unit 14.

Thereafter, when the return event occurs in the robot 10, the controller 18 may control the driving unit 13 such that the robot moves to a position corresponding to preset reference coordinate information among coordinate information related to the closed loop by tracking along the wire on the basis of map information related to the closed loop and coordinate information related to the current position of the robot (S504).

In detail, referring to FIG. 5B, the controller 18 may detect information related to a traveling path of a first direction 540a following the wire. Also, the controller 18 may detect information related to a traveling path of a second direction 540b different from the first direction following the wire.

Also, the controller 18 may set information related to a movement path of the robot 10 by comparing the detected information.

In an embodiment, the controller 18 may set information related to a movement path of the robot 10 such that at least one of time and power required for the robot 10 to move to a position corresponding to the reference coordinate information 500.

That is, the controller 18 may detect information related to at least one of time and power required for the robot 10 to move to a position corresponding to the reference coordinate information 500 along traveling paths of the first and second directions. In this manner, the controller 18 may select any one of the traveling paths in the first and second directions to minimize time or power required for the robot 10 to move to a position corresponding to the reference coordinate information 500 using the detected information.

Figure 5C:
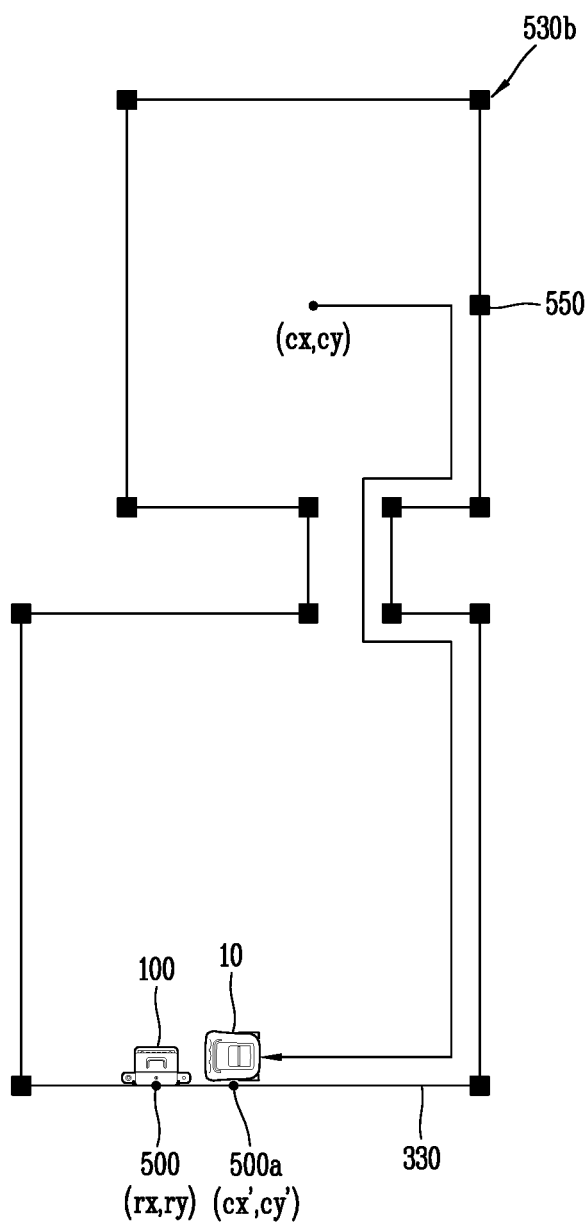
FIG. 5C is another conceptual view illustrating the embodiment illustrated in FIG. 5A.

In this connection, referring to FIG. 5C, the controller 18 may control the driving unit 13 using information related to a set movement path. That is, when a return event occurs in the robot 10, the controller 18 may control the driving unit 13 such that the robot 10 moves to the charging device 100 along the wire.

Meanwhile, as illustrated in FIG. 5C, while the robot 10 is moving along the wire, the controller 18 may correct stored map information using coordinate information sensed by the sensing unit.

In detail, the controller 18 may control the sensing unit 14 to sense coordinate information at every predetermined time interval, while the robot 10 is moving to the position 500 corresponding to the reference coordinate information (rx, ry) from the position (cx, cy) at a timing when the return event occurs.

Also, when the robot 10 arrives at the position 500 corresponding to the reference coordinate information (rx, ry), the controller 18 may detect information related to a difference between coordinate information (cx', xy') sensed by the sensing unit 14 and the reference coordinate information (rx, ry) at a timing when the robot 10 arrives.

In this manner, the controller 18 may correct the map information 330 related to the operation region stored in the memory 17 using the detected difference.

Meanwhile, at a timing when the return event occurs in the robot 10, the controller 18 may determine whether a cutting operation in a partial region of the operation region where the robot 10 is positioned has been completed.

When the return event occurs in a state in which the cutting operation on the partial region where the robot 10 is positioned has not been completed, the controller 18 may set coordinate information related to a re-start point of the robot 10.

In detail, using at least one of coordinate information related to a position of the robot 10 at a point where the return event occurs and information related to a traveling coordinate axis, the controller 18 may set coordinate information related to any one point of the wire to coordinate information related to re-start point of the robot 10.

Here, when it is determined that a re-start event occurs in the robot 10, the controller 180 may control the driving unit 13 such that the robot 10 moves to a position corresponding to coordinate information related to the set re-start point.

In this connection, referring to FIG. 5C, the controller 18 may set at least one point 550 of the wire closest to the position of the robot 10 in the traveling coordinate axis at a timing when the return event occurs, to a re-start point.

Also, in a case where a set re-start point is in plurality, the controller 18 may select a point closest to a position corresponding to reference coordinate information among the plurality of re-start points to select a final re-start point.

Figure 5D:
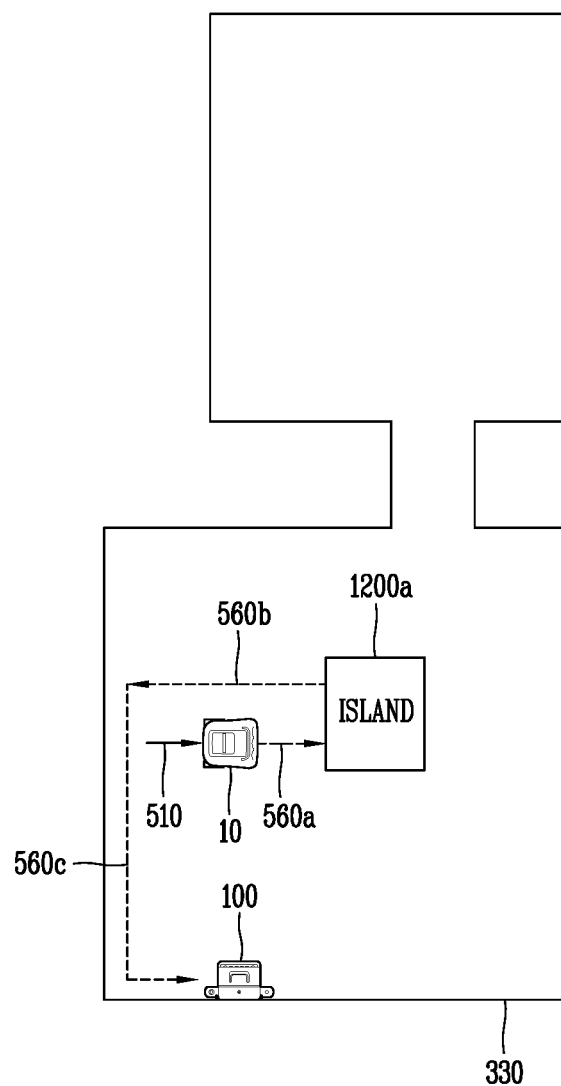
FIG. 5D is yet another conceptual view illustrating the embodiment illustrated in FIG. 5A.

Meanwhile, referring to FIG. 5D, the controller 18 may determine whether a wire tracked by the robot 10 is a wire installed on an outer side of an obstacle positioned within the operation region. Also, on the basis of the determination result, the controller 18 may control the driving unit to move the robot 10 to any one point of the wire installed in the contour line of the operation region.

That is, in a case where a wire 1200a forming a separate closed loop is installed within a closed loop related to the operation region, the controller 18 may distinguish between the wire forming the separate closed loop and the wire installed in the contour line of the operation region.

In detail, the controller 18 may compare coordinate information related to the set re-start point with the map information 300 related to the operation region stored in the memory 17 to determine whether the set re-start point corresponds to the wire 1200a separately installed within the operation region.

Also, the controller 18 may compare a length of a traveling path of the robot 10 circulating along the wire from the set re-start point with a length of the contour line of the operation region extracted from the map information 330 to determine whether the set re-start point corresponds to the wire 1200a separately installed within the operation region.

When it is determined that the set re-start point corresponds to the wire 1200a separately installed within the operation region, the controller 18 may change coordinate information related to the re-start point.

As illustrated in FIG. 5D, the controller 18 may move the robot 10 toward the changed re-start point (560b) and move the robot 10 along the wire 1200 defining the contour line of the operation region toward the charging device 100 from the changed re-start point (560*c*).

Hereinafter, an embodiment of a method of controlling traveling regarding a gradient of an operation region of a moving robot according to the present disclosure will be described with reference to FIGS. 6A to 6C.

Figure 6A:
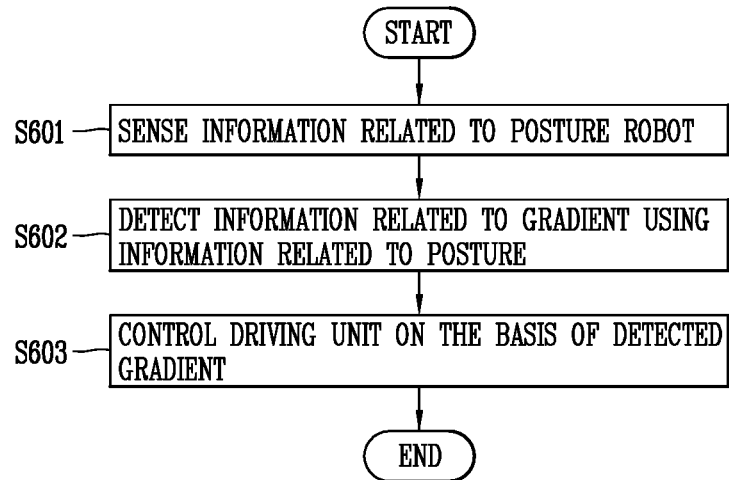
FIG. 6A is a flow chart illustrating an embodiment of a method for controlling traveling of a moving robot on a gradient of an operation region according to the present disclosure.

As illustrated in FIG. 6A, the sensing unit 14 may sense information related to a posture of the robot 10 (S601).

In detail, the sensing unit 14 may sense information related to a posture of the robot 10 with respect to a preset 3-dimensional system of coordinates. That is, the sensing unit 14 may sense information related to a pitch, a roll, and a yaw corresponding to each coordinate axis of the 3-dimensional system of coordinates. The sensing unit 14 may sense information related to a pitch angle, a roll angle, and a yaw angle.

For example, the sensing unit 14 may sense information related to a posture or a bearing of the robot 10 using at least one of an attitude heading reference system (AHRS) and an inertial measurement unit (IMU).

Figure 6B:
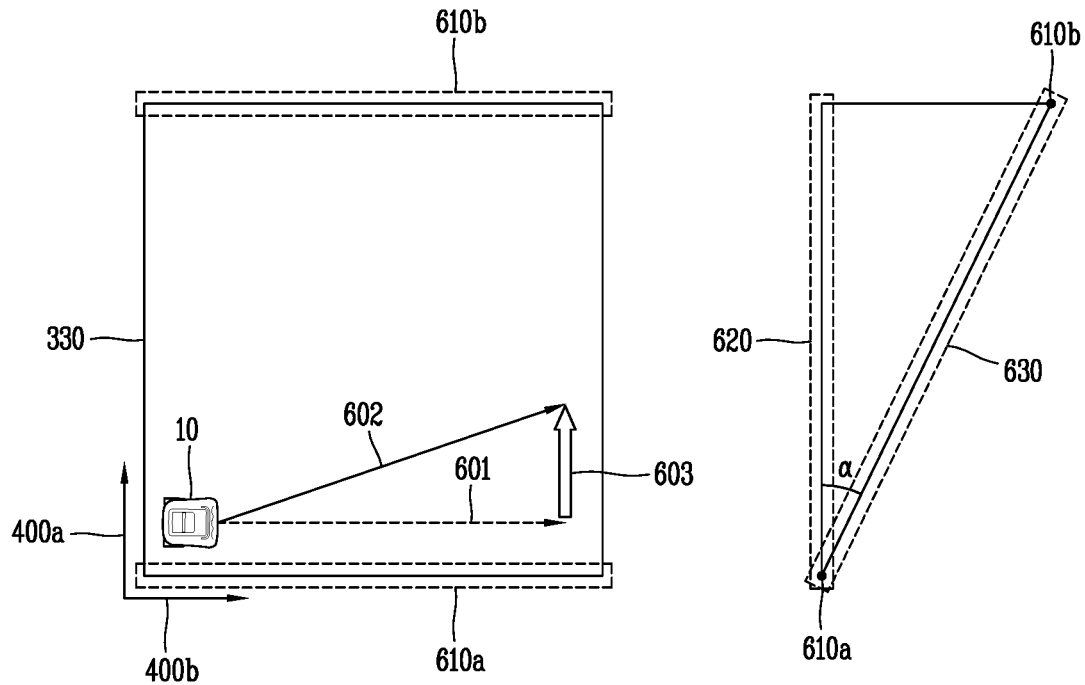
FIG. 6B is a conceptual view illustrating the embodiment illustrated in FIG. 6A.

In another example, referring to FIG. 6B, the information related to the preset 3-dimensional system of coordinates may include information related to the traveling coordinate axes 400*a* and 400*b* stored in the memory 17. Also, the information related to the preset 3-dimensional system of coordinates may include information related to a coordinate axis set in a direction perpendicular to the ground.

Thereafter, the controller 18 may detect information related to a gradient corresponding to a current position of the robot 10 using information related to a posture of the robot 10 (S602).

In detail, the information related to a gradient may include information related to a first angle, a second angle, and a third angle respectively corresponding to coordinate axes of the information related to the preset 3-dimensional system of coordinates. For example, the first angle, the second angle, and the third angle may correspond to a pitch angle, a roll angle, and a yaw angle, respectively.

Thereafter, the controller 18 may control the driving unit 13 on the basis of information related to the detected gradient.

In detail, the memory 17 may store information related to first and second coordinate axes regarding the operation region of the robot 10. In this case, the controller 18 may set a first compensation value regarding a traveling distance in the first coordinate axis direction using the information related to the gradient. Also, the controller 18 may set a second compensation value regarding a traveling distance in the second coordinate axis direction using the information related to the gradient. Also, the controller 18 may control the driving unit 13 using the set first and second compensation values.

In this connection, a method for controlling the driving unit 13 of the robot 10 in an operation region having a specific sloped angle (α) with respect to the first coordinate axis 400*a* will be described with reference to FIG. 6B.

As illustrated in FIG. 6B, a first side 610*a* of an operation region is a lower side of a slope and a second side 610*b* may be an upper side of the slope.

The memory 17 may store map information 330 related to the operation region, information related to the traveling coordinate axes 400*a* and 400*b* of the robot 10, and the like. Here, the stored traveling coordinate axes may correspond to first and second coordinate axes, respectively.

Referring to FIG. 6B, the controller 18 may set a first compensation value 603 regarding a traveling distance in the first coordinate axis 400*a* direction using information related to a gradient regarding the first coordinate axis 400*a*.

For example, the controller 18 may set a first compensation valve 603 in consideration of a gradient (a) of the operation region in order to move the robot 10 to a first path 601. Also, the controller 18 may control the driving unit 13 such that the robot 10 travels to a second path 602 by applying the first compensation value 603. While the robot 10 is traveling to the second path 602, slip may occur in the driving wheels included in the driving unit 13, and accordingly, the robot 10 may finally move to the first path 601.

Meanwhile, the memory 17 may store first and second reference coordinates information included in the operation region. Also, as the robot 10 moves, the sensing unit 14 may sense information related to a change in position of the robot 10.

Here, the controller 18 may calculate first displacement information related to the change in position sensed by the sensing unit while the robot was moving from a position corresponding to the first reference coordinate information to a position corresponding to the second reference coordinate information.

Also, the controller 18 may calculate second displacement information related to a difference between the first reference coordinate information and the second reference coordinate information. The controller 18 may compare the calculated first and second displacement information to detect error information related to the gradient. In this manner, the controller 18 may correct the first and second compensation values using the detected error information.

For example, the first reference coordinate information may correspond to a position in which the charging device of the lawn mowing robot is installed. Also, the second reference coordinate information may correspond to a position farthest from the position in which the charging device is installed, among coordinates information included in the operation region.

Here, in a case where the robot 10 moves from the position corresponding to the first reference coordinate information to a position corresponding to the second reference coordinate information, the controller 18 may control the driving unit to move along the wire installed in the contour line of the operation region.

Also, in another example, the driving unit 13 may perform traveling in a zigzag manner with respect to at least one of the first and second coordinate axes 400*a* and 400*b* in at least partial region of the operation region.

Here, the controller 18 may repeatedly reset the first and second compensation values regarding the partial region according to the zigzag traveling.

Meanwhile, the memory 17 may store map information formed by a plurality of pieces of 3-dimensional coordinate information included in the operation region.

In this case, the controller 18 may detect information related to a gradient of at least partial region of the operation region using the plurality of pieces of 3-dimensional coordinate information. When the robot 10 enters the partial region, the controller 18 may control the driving unit on the basis of information related to the gradient.

Figure 6C:
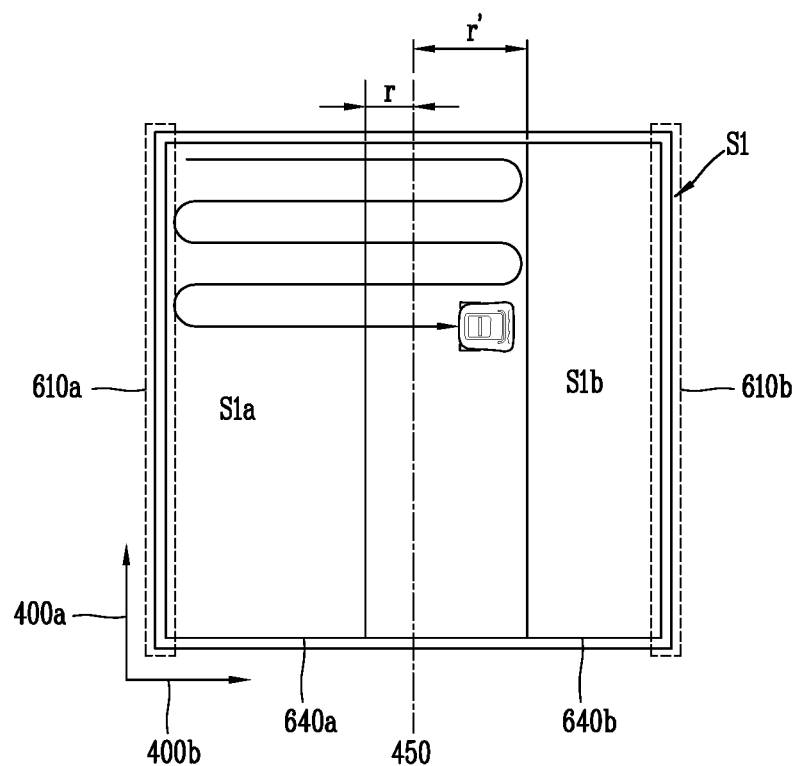
FIG. 6C is another conceptual view illustrating the embodiment illustrated in FIG. 6A.

As illustrated in FIG. 6C, the controller 18 may set information related to a plurality of regions S1*a* and S1*b* such that the operation region is divided into the plurality of regions S1*a* and S1*b*. The controller 18 may detect information related to the gradient by the plurality of regions.

The controller 18 may control the driving unit such that the body may move according to a preset movement pattern to a region spaced apart by a predetermined additional traveling distance from any one contour line of the plurality of divided regions.

In detail, the controller 18 may change the additional traveling distance using information related to the detected gradient.

As illustrated in FIG. 6C, in a case where the first side 610*a* is a lower side of a gradient and the second side 610*b* is an upper side of the gradient, the controller 18 may detect information related to the gradient corresponding to the first region S1*a* included in the operation region.

Also, in a case where an operation is performed on the first region S1*a*, the controller 18 may move the robot 10 to a region spaced apart by an additional traveling distance r' from a boundary 450 of the first region by a preset movement pattern.

For example, when FIGS. 6C and 4G are compared, the additional traveling distance r' (please refer to FIG. 6C) in the operation region having a gradient may be set to be longer than the additional traveling distance r (please refer to FIG. 4G) in the operation region as an even ground.

Hereinafter, a method for determining whether an obstacle is present within an operation region of a moving robot according to the present disclosure will be described with reference to FIGS. 7A and 7B.

As illustrated in FIG. 7A, the memory 17 may store information related to movement history of the robot 10 (S701).

In detail, the controller 18 may generate information related to movement history of the robot 10 using information related to an operational state of the driving unit 13 at every predetermined time interval and control the memory 17 to store the generated information.

For example, whenever a traveling direction of the robot 10 is changed, the controller 18 may detect information related to a movement distance, a movement direction, and a movement start spot of the robot 10 immediately before the traveling direction is changed, and store the detected information in the memory 17 as information related to movement history of the robot 10.

Thereafter, the controller 18 may determine whether an obstacle is present in at least a partial region of the operation region on the basis of the information related to movement history of the robot 10 (S702).

In this connection, referring to FIG. 7B, the driving unit 13 may operate to move the robot 10 on the basis of a preset movement pattern within the operation region. Hereinafter, an embodiment related to the robot 10 which moves in the first traveling axis 400*b* direction and performs traveling in a zigzag manner will be described with reference to FIG. 7B.

The memory 17 may store information related to movement history of the robot 10 according to first traveling 701 and 702 of the robot 10.

After the first traveling 701 and 702, when second traveling 703 and 704 of the robot 10 shorter in movement distance than the first traveling is performed by a predetermined reference number of times or greater and third traveling 705 of the robot 10 longer in movement distance than the second traveling is performed after the second traveling, the controller 18 may determine that an obstacle is present in at least partial region of the operation region.

Here, the reference number of times may be changed on the basis of a user input.

When it is determined that an obstacle is present in a partial region, the controller 18 may control the driving unit 13 to change a movement direction of the robot 10 (S703).

In detail, referring to FIG. 7B, the robot 10 may move in a positive direction of the first coordinate axis 400*a* and travel in a zigzag manner. That is, the robot 10 may sequentially perform the first traveling 701 and 702, the second traveling 703 and 704, and the third traveling 705.

In this case, as described above, in a case where the controller 18 determines that an obstacle 700 is present in a partial region of the operation region, the controller 18 may control the driving unit 13 to change a movement direction in order to move the robot 10 in a negative direction of the first coordinate axis 400*a*.

After the movement direction of the robot 10 is changed, the controller 18 may verify a determination result related to the presence of the obstacle using information related to traveling of the robot 10 (S704).

In detail, referring to FIG. 7B, after the movement direction of the robot 10 is changed, the driving unit 13 may perform fourth traveling 706. The controller 18 may compare coordinate information related to an end point of the fourth traveling and coordinate information related to an end point of the second traveling 704 to verify the determination result related to the presence of the obstacle 700.

That is, when the second coordinate axis 400*b* component of the coordinate information related to the end point of the fourth traveling 706 is greater than the second coordinate axis 400*b* component of the coordinate information related to the end point of the second traveling 704, the controller 18 may verify the determination result related to the presence of the obstacle 700.

Thereafter, the controller 18 may control the driving unit 13 on the basis of the verification result.

In detail, when it is verified that an obstacle is present, the controller 18 may control the driving unit 13 to move the robot 10 to a specific position and subsequently resume the cutting operation. Referring to FIG. 7B, when it is verified that the obstacle is present, the controller 18 may move the robot 10 to a specific position to resume the cutting operation on a region in which the robot has not performed the cutting operation yet due to the verified obstacle, using history information related to the second traveling 703. For example, the specific position may be a position corresponding to second traveling coordinate axis coordinate information of the second traveling 703 in the wire installed in the contour line of the operation region.

Also, when it is verified that an obstacle is not present, the controller 18 may control the driving unit 13 to change the changed movement direction to a previous state such that the robot 10 moves according to a preset movement pattern.

According to the present disclosure, an effect of minimizing a portion in which lawn is not mowed in an operation region of the lawn mowing robot can be obtained.

Also, according to the present disclosure, operation efficiency of the lawn mowing robot may be increased.

Also, according to the present disclosure, accuracy of map information related to an operation region stored in the lawn mowing robot may be enhanced.

Also, according to the present disclosure, power supply of the lawn mowing robot may be automated and various errors generated in the lawn mowing robot may be prevented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A robot comprising:
a body;
a driving unit to drive the body such that the body travels within an operation region; and
a controller to generate map information corresponding to an operation region, the controller setting first information corresponding to at least one reference line using coordinate information corresponding to vertices included in a polygon forming the operation region, and the controller, using the first information, setting second information corresponding to a plurality of regions such that the operation region is divided into the plurality of regions,
wherein the controller, using the second information, controls the driving unit such that the body travels according to a preset movement pattern for each of the plurality of divided regions, and
wherein when a maximum length of any one of the divided regions along a preset traveling direction is greater than a predetermined maximum traveling distance value, the controller resets the second information such that the divided region is divided into a plurality of sub-regions.

2. The robot of claim 1, wherein
the controller detects coordinate information corresponding to a concave vertex of the vertices and, using the detected coordinate information, sets the first information,
whereby an internal angle of the polygon formed around the concave vertex is an obtuse angle.

3. The robot of claim 2, wherein the controller selects at least one of the at least one reference line using third information corresponding to a preset traveling direction for the robot, and sets the second information using the first information related to the selected at least one reference line.

4. The robot of claim 1, wherein when the controller does not detect coordinate information corresponding to a concave vertex of the vertices, the controller sets the second information such that the operation region is divided into the plurality of regions using fourth information corresponding to a predetermined maximum traveling distance value for the robot.

5. The robot of claim 1, wherein the controller sets information related to each of the sub-regions using the maximum length value and the predetermined maximum traveling distance value in the traveling direction.

6. The robot of claim 1, wherein the controller controls the driving unit such that the body travels, according to the preset movement pattern, to a region that is spaced apart from a contour line of the divided region by a predetermined additional traveling distance.

7. The robot of claim 1, further comprising:
a sensing unit to sense coordinate information corresponding to a position of the body,
wherein the controller generates polygonal map information related to the operation region using the sensed coordinate information.

8. The robot of claim 7, wherein the controller:
calculates a difference in area between a rectangle tangent to a polygon corresponding to the generated map information and the polygon,
sets information related to the rectangle such that the calculated difference in area includes a minimum value, and
sets information related to a traveling coordinate axis of the robot using the set information related to the rectangle.

9. The robot of claim 1, further comprising:
a memory to store information corresponding to a movement history of the body,
wherein the controller determines whether an obstacle is located in any of the plurality of divided regions according to the stored movement history information, and
when it is determined that an obstacle is located in any of the plurality of divided regions, the controller controls the driving unit to change a travel direction of the body, and
after the movement direction is changed, the controller verifies, using information related to the traveling of the body, the determination result related to the location of the obstacle.

10. The robot of claim 9, wherein when the controller verifies that the determination result is accurate, the controller controls the driving unit to drive the body to a position corresponding to one of the plurality of divided regions where the obstacle is not located.

11. The robot of claim 9, wherein when the controller verifies that the determination result is wrong because the obstacle is not located within any of the plurality of divided regions, the controller controls the driving unit to change the movement direction to a previous state such that the robot moves according to the preset movement pattern.

12. A method for controlling a robot, the method comprising:
generating, by a controller, map information corresponding to an operation region for the robot;
setting, by the controller, first information corresponding to at least one reference line using coordinate information corresponding to vertices included in a polygon forming the operation region;
setting, by the controller, using the first information, second information corresponding to a plurality of regions such that the operation region is divided into the plurality of regions;
driving a driving unit, using the second information, to move the robot according to a preset movement pattern for each of the plurality of divided regions, the driving unit being controlled by the controller; and
setting, by the controller, the second information such that the operation region is divided into the plurality of regions using fourth information corresponding to a predetermined maximum traveling distance value for the robot when the controller does not detect coordinate information corresponding to a concave vertex of the vertices.

13. The method of claim 12, further comprising:

detecting, by the controller, coordinate information corresponding to a concave vertex of the vertices when it is determined that an internal angle of the polygon formed around the concave vertex is an obtuse angle; and setting the first information using the detected coordinate information.

14. The method of claim 12, further comprising:

selecting, by the controller, at least one of the at least one reference line using third information corresponding to a preset traveling direction for the robot;

and setting the second information using the first information related to the selected at least one reference line.

15. The method of claim 12, further comprising:

storing, using a memory, information corresponding to a movement history of the body, determining, by the controller, whether an obstacle is located in any of the plurality of divided regions according to the stored movement history information, and controlling the robot to change a travel direction when it is determined that an obstacle is located in any of the plurality of divided regions, verifying, by the controller, after the movement direction is changed, the determination result related to the location of the obstacle.

16. The method of claim 15, wherein when the determination result is verified as accurate, the robot is driven to a position corresponding to one of the plurality of divided regions where the obstacle is not located.

17. The method of claim 15, wherein when the determination result is not verified because the obstacle is not located within any of the plurality of divided regions, the movement direction of the robot is changed to a previous state such that the robot moves according to the preset movement pattern.

* * * * *